United States Patent
Tanaka

(10) Patent No.: US 6,435,739 B1
(45) Date of Patent: Aug. 20, 2002

(54) CAMERA HAVING A SPRING LOADED MECHANISM FOR DRIVING A LIGHT-SHIELDING DOOR MEMBER

(75) Inventor: Yasuhiko Tanaka, Saitama (JP)

(73) Assignee: Fuji Photo Optical Co. Ltd., Saitama (JP)

( * ) Notice: Subject to any disclaimer, the term of this patent is extended or adjusted under 35 U.S.C. 154(b) by 0 days.

(21) Appl. No.: 09/588,466

(22) Filed: Jun. 6, 2000

(51) Int. Cl.$^7$ .......................... G03B 17/00; G03B 17/02
(52) U.S. Cl. .......................... 396/448; 396/536
(58) Field of Search .................... 396/448, 513, 396/536, 538

(56) References Cited

U.S. PATENT DOCUMENTS

| | | | | |
|---|---|---|---|---|
| 4,019,192 A | * | 4/1977 | Miyagawa | 396/448 |
| 5,822,635 A | * | 10/1998 | Omi et al. | 396/411 |
| 5,828,921 A | * | 10/1998 | Miyawaki | 396/538 |
| 5,937,219 A | * | 8/1999 | Morishita | 396/448 |
| 5,943,520 A | | 8/1999 | Komatsuzaki et al. | 396/448 |
| 6,275,662 B1 | * | 8/2001 | Yoshida et al. | 396/538 |

* cited by examiner

Primary Examiner—Christopher Mahoney
(74) Attorney, Agent, or Firm—Young & Thompson

(57) ABSTRACT

There is disclosed a camera with a cover sliding between a cartridge exchange position and a work position for permitting photography. A cam plate having a driving rack is mounted securely on inside the sliding cover. A coupling gear is mounted in a camera body with its teeth protruded out of the camera body. The driving rack is engaged with the teeth of the coupling gear only while the sliding cover moves between the work position and the cartridge exchange position, so the coupling gear is rotated as the sliding cover moves between the work position and the cartridge exchange position. The rotational movement of the coupling gear is transmitted to a pinion through a rack plate. The pinion is formed integrally with a door drive shaft. The door drive shaft is engaged with a door member of a loaded photo film cartridge, for rotating the door member to close or open a film port of the cartridge. The pinion is urged by a spring that functions as a toggle spring. The spring urges the pinion in a direction to close the door member after the pinion rotates halfway in the closing direction, or alternatively in a direction to open the door member after the pinion rotates halfway in the opening direction.

6 Claims, 18 Drawing Sheets

CAMERA HAVING A SPRING LOADED MECHANISM FOR DRIVING A LIGHT-SHIELDING DOOR MEMBER

BACKGROUND OF THE INVENTION

1. Field of the Invention

The present invention relates to a camera, and more particularly to a camera for an IX240 type photo film cartridge, that has a door driving mechanism for operating a door member of the cartridge in cooperation with a cover that slides between a cartridge exchange position for permitting loading and unloading the photo film cartridge, a work position for permitting photography, and a rest position for deactivating the camera.

2. Background Arts

The IX240 type photo film cartridge contains the whole length of a photo filmstrip inside its cartridge shell, and advances the photo filmstrip out of the cartridge shell when a spool of the cartridge is rotated in an unwinding or advancing direction. While the whole length of the photo filmstrip is contained in the cartridge shell, a film port is closed by a light-shielding door member that swings inside the film port to open and close the film port. A spool locking mechanism is interconnected with the door member, to lock the spool when the door member is closed. The spool is unlocked by opening the door member.

The IX240 type camera is provided with a door driving mechanism for opening and closing the door member of the photo film cartridge as loaded therein. The door driving mechanism opens the door member after the photo film cartridge is inserted in a cartridge chamber and is closed light-tightly. After the entire length of the photo filmstrip is rewound into the cartridge shell, the door driving mechanism closes the door member.

One type of the door driving mechanism is driven by a motor or an actuator to open and close the door member, and another type is manually operated for the sake of power-saving and compactness. Japanese Laid-open Patent Application No. 10-104712 (U.S. Pat. No. 5,943,520) discloses a compact camera with a sliding cover that slides on a camera body between a rest position covering most of the camera body and a work position uncovering photographic elements of the camera which are necessary for photography. This camera has a door driving mechanism that opens and closes the door member of the IX240 type photo film cartridge in cooperation with the sliding cover.

The sliding cover is overlaid on the lid of the cartridge chamber in the work position as well as in the rest position, so as to prevent opening the lid. To open the cartridge chamber lid, the sliding cover must be slid further in the uncovering direction from the work position to a cartridge exchange position. In order to prevent the sliding cover from sliding unexpectedly to the cartridge exchange position, a safety lock mechanism is provided for locking the sliding cover at an intermediate position between the work position and the cartridge exchange position.

When the sliding cover is moved back to the work position or the rest position after a new photo film cartridge is loaded in the IX240 type camera, the camera automatically detects condition of usage of the photo film cartridge and also reads film data of the filmstrip, such as film speed and film type, from a data disc that is mounted on the spool of the photo film cartridge. So the spool is rotated by a motor in a rewinding direction for reading the film data. Therefore, if the door member is not fully opened and thus the spool is not completely unlocked at the work position or the rest position of the sliding cover, the spool locking mechanism would be broken when a rotational power is applied from the motor to the spool. On the other hand, if the door member is not completely closed when the sliding cover reaches the cartridge exchange position and the cartridge chamber lid is open, the photo filmstrip would be fogged. For these reasons, the door driving mechanism is required to finish opening the door member of the newly loaded photo film cartridge before the sliding cover is moved back to the work position, and finish closing the door member before the sliding cover reaches the cartridge exchange position.

However, the door driving mechanism disclosed in the above prior art finishes opening or closing the door member just when the sliding cover reaches the work position or the cartridge exchange position respectively. Therefore, there remains some possibility of breaking the spool lock mechanism or fogging the photo filmstrip.

Moreover, since the door member swings to open and close the film port, the door driving mechanism must convert the sliding movement of the sliding cover into a rotational movement for actuating the door member. For this reason, the door driving mechanism has been complicated, so it has been difficult to slide the cover smoothly when it is connected with such door driving mechanism.

SUMMARY OF THE INVENTION

In view of the foregoing, an object of the present invention is to provide a camera with a sliding cover that ensures the door member to be opened or closed completely in response to a small movement of the sliding cover that can be slid by a small force.

A camera according to the invention comprises:

a camera body directed to loading a photo film cartridge having a light-shielding door member mounted pivotally in a film port thereof to rotate between a closed position and an open position for closing and opening the film port respectively;

a cover member mounted on the camera body and movable between a cartridge exchange position for permitting loading and unloading the photo film cartridge, a rest position for deactivating the camera, and a work position for permitting photography through the camera, the cover member prohibiting loading or unloading the photo film cartridge in the rest and work positions;

a door drive shaft that is engaged with one axial end of the door member when the photo film cartridge is loaded, for rotating the door member between the closed position and the open position;

an input member that rotates together with the drive shaft;

an urging member for urging the drive shaft to rotate alternatively in a direction to open the door member or in a direction to close the door, such that the urging member urges the drive shaft in the opening direction and holds the door member in the open position after the drive shaft rotates through a predetermined angle in the opening direction from the closed position of the door member, whereas the urging member urges the drive shaft in the closing direction and holds the door member in the closed position after the drive shaft rotates through a predetermined angle in the closing direction from the open position of the door member; and an engaging member that engages the cover member with the input member only while the cover member moves between the work position and the cartridge exchange position, for causing the input member to rotate in the closing direction as the cover member moves from the work position to the cartridge exchange position, and causing the input member to rotate in the opening direction as the cover member moves from the cartridge exchange position to the work position.

Because the cover member is engaged with the input member only while the door member is moved between the work position and the cartridge exchange position, the door member is not rotated while the cover member is moved between the work position and the rest position. So the photo filmstrip would not be pinched by the door member during the usual operating condition of the camera. Because of the urging member, the door member is completely closed and held in the closed position before the cover member reaches the cartridge exchange position, or completely opened and held in the open position before the cover member reaches the work position. Accordingly, the photo filmstrip would not be fogged on unloading the photo film cartridge, or the spool of the photo film cartridge is unlocked and is enabled to rotate without any hindrance as soon as the cover member reaches the work position.

According to a preferred embodiment, the input member is a pinion that rotates in coaxial with the drive shaft, and the engaging member comprises a rack provided securely on the cover member. The cover member preferably slides on the camera body between the cartridge exchange position and the work position and the rest position. According to this configuration, linear movement of the cover member is converted into rotational movement through a simple mechanism with a high reliability without lowering smoothness of the movement of the cover member. Thus, the present invention provide a simple and stable door driving mechanism with a low cost.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
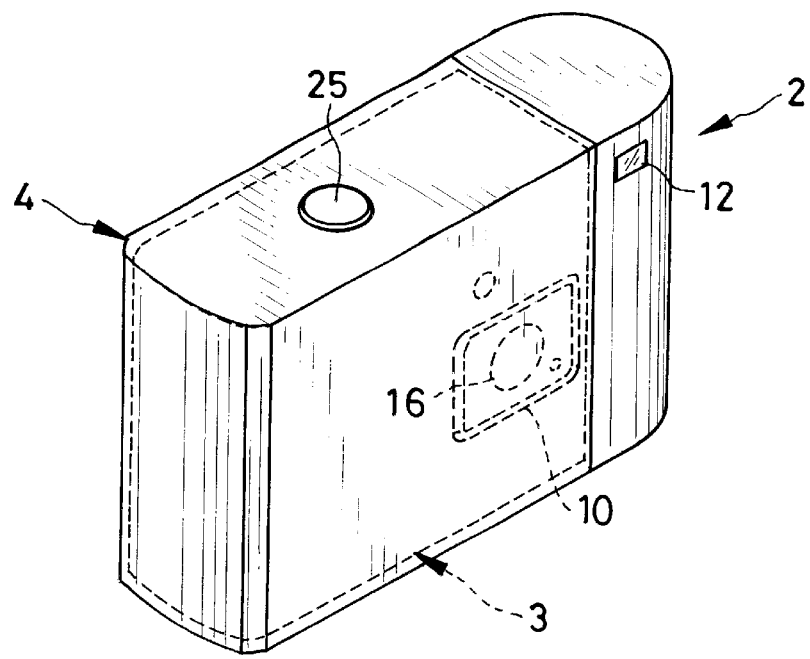
FIG. 1 is a perspective view of an embodiment of camera of the present invention in a rest position where its sliding cover is closed.
Figure 2:
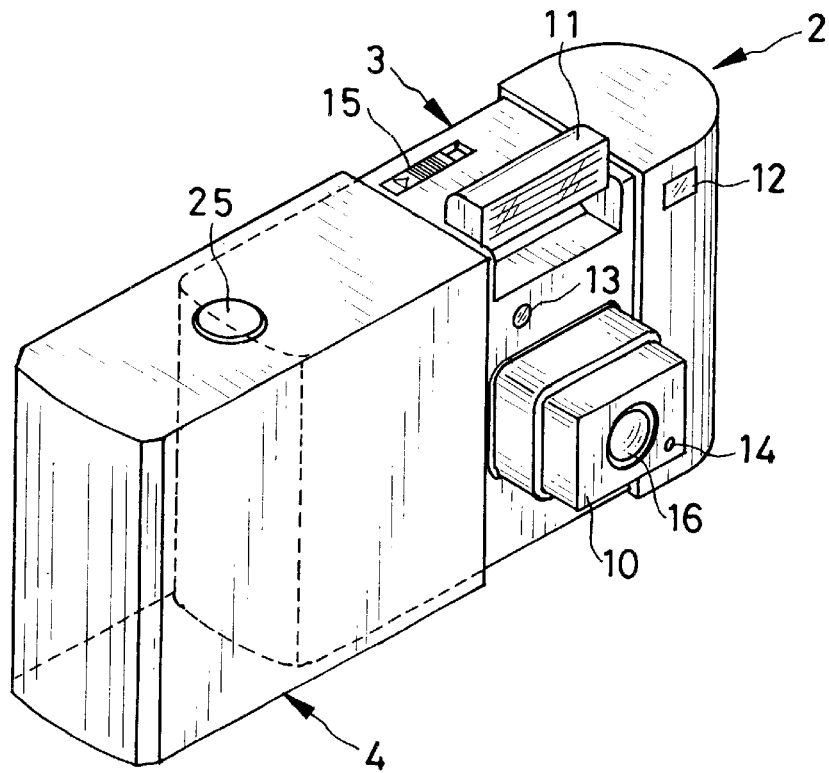
FIG. 2 is a perspective view of the camera of FIG. 1, with its sliding cover opened to a work position.
Figure 3:
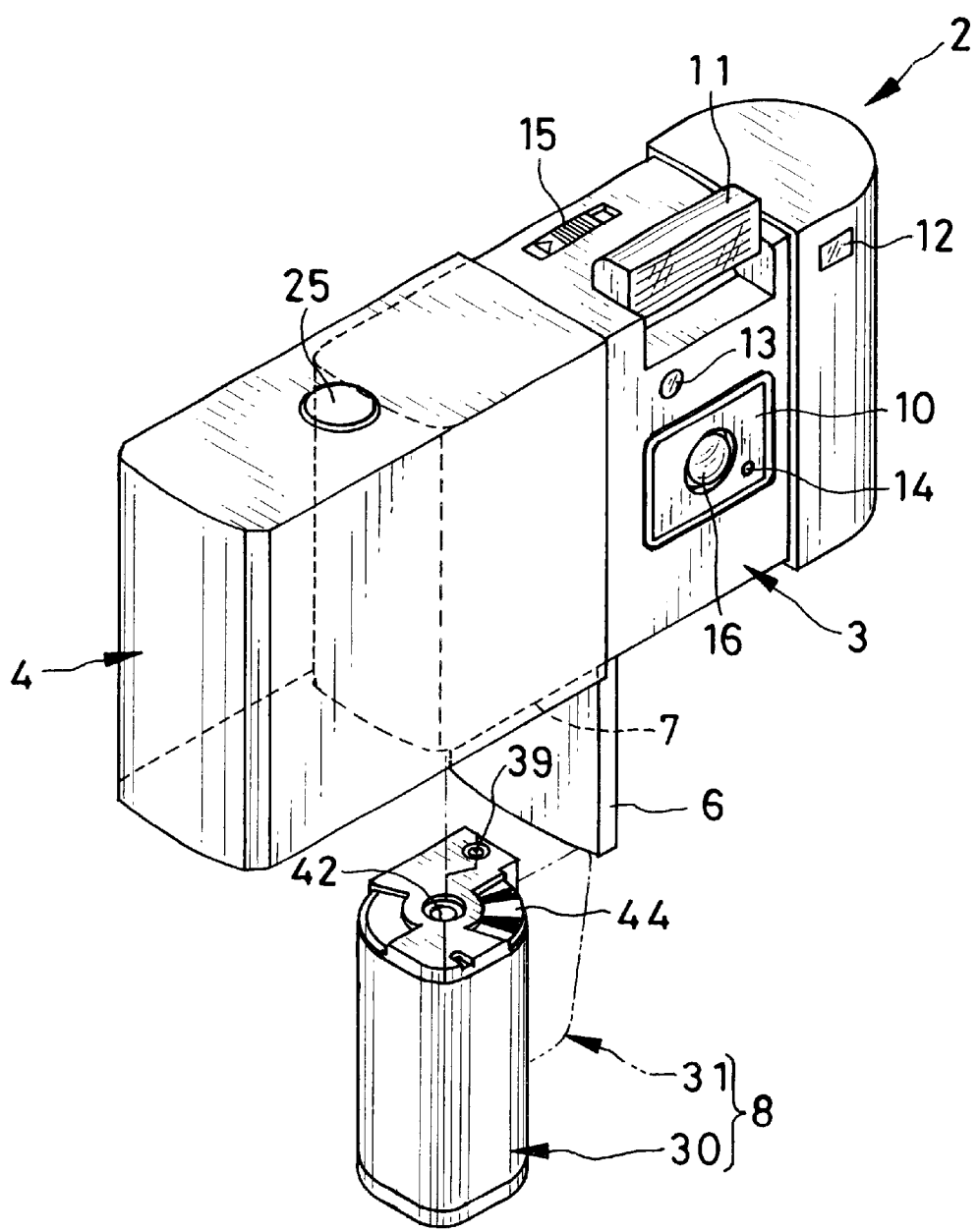
FIG. 3 is a perspective view of the camera of FIG. 1, with its sliding cover opened to a cartridge exchange position.

A camera 2 shown in FIGS. 1 to 3 consists of a substantially parallelepiped camera body 3 and a sliding cover 4 that is of a substantially parallelepiped shape with an open side. The sliding cover 4 is fitted on the camera body 3 from one side of the camera body 3, and is able to slide on the camera body 3. The sliding cover 4 is made of a light and strong material such as plastic, aluminum, titanium.

While the camera 2 is not used, most of the camera body 3 is inserted in the sliding cover 4, as shown in FIG. 1, so the camera 2 in this position is very small and compact. To use the camera 2, the sliding cover 4 is pulled out halfway from the camera body 2, as shown in FIG. 2, and is used as a grip. By pulling out the sliding cover 4 further from the camera body 2, as shown in FIG. 3, a cartridge chamber lid 6 on a bottom side of the camera body 2 is uncovered completely, so it comes to be possible to open the cartridge chamber lid 6 and load or unload a photo film cartridge 8 of IX240 type into or from a cartridge chamber 7. Hereinafter, the positions of the camera 2 in FIGS. 1, 2 and 3 will be referred to as a rest position, a work position and a cartridge exchange position respectively.

The sliding cover 4 is designed to stop at each of the rest position, the work position, the cartridge exchange position and a safety lock position located between the work position and the cartridge exchange position. While sliding to the work position, the sliding cover 4 turns on a not-shown power switch of the camera body 3. The power switch is turned off when the sliding cover 4 moves out of the work position.

On the front and top sides of the camera body 3, there are provided a lens barrel 10, a flash projector 11, a viewfinder 12, a range finder window 13, a photometric window 14, and an unlocking member 15. The lens barrel 10 holds a taking lens 16 with variable focal length. The lens barrel 10 is stowed in the camera body 3 while the power switch is off, and is protruded from the camera body 3 when the power switch is on. When the sliding cover 4 moves from the rest position to the work position, the flash projector 11 automatically flaps up to a flashing position as shown in FIG. 2 according to a spring force. To close the sliding cover 4, the flash projector 11 is pushed into a recessed portion of the camera body.

Figure 4:
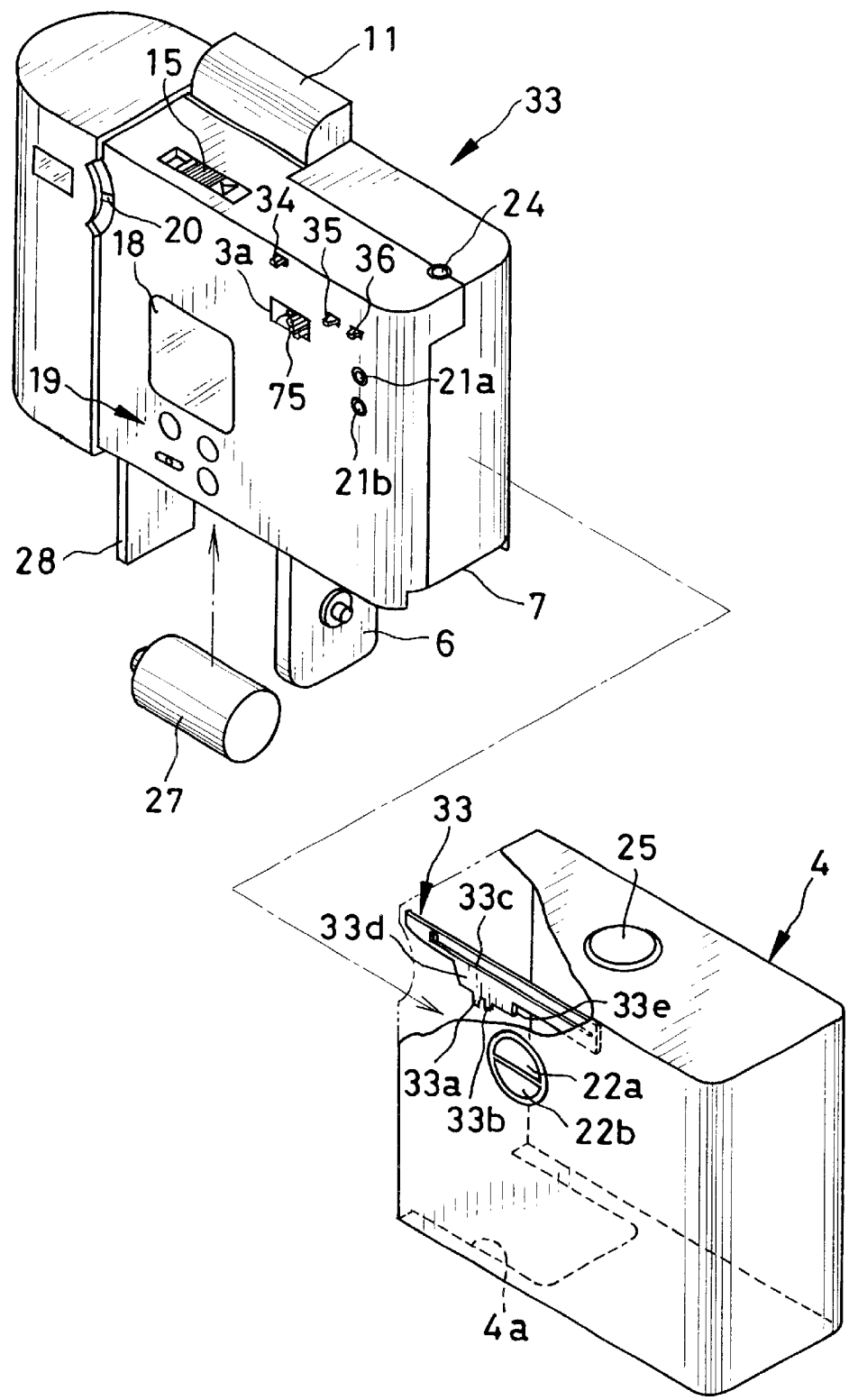
FIG. 4 is a rear perspective view of the camera of FIG. 1, wherein the sliding cover is removed from a camera body.

As shown in FIG. 4, on the back side of the camera body 3, there are provided a LCD panel 18, various kinds of switches 19, a picture frame format selection switch 20, and a pair of zooming switches 21a and 21b. Among the switches 19, there is a rewind switch for rewinding a photo filmstrip 31 into a cartridge shell 30 at an appropriate time before the photo filmstrip 31 is fully exposed. A pair of zoom buttons 22a and 22b are provided on the sliding cover 4 at those positions opposing to the zooming switches 21a and 21b when the sliding cover 4 is in the work position. Thus, the zooming switches 21a and 21b are operated through the zoom buttons 22a and 22b respectively.

A shutter switch 24 is disposed on the top side of the camera body 3, whereas a shutter button 25 is provided on a top side of the sliding cover 4 at a position opposing to the shutter switch 24 in the work position. Thus, the shutter switch 24 is operated through the shutter button 25. When the shutter switch 24 is pressed halfway, a subject distance and a subject brightness are measured through the range finder window 13 and the photometric window 14 respectively.

The cartridge chamber lid 6 is pivotally mounted at its one side to a middle portion of the bottom of the camera body 3, so as to flap up and down between a closed position and an open position. The camera body 3 has a not-shown film chamber on opposite side of the lens barrel 10 from the cartridge chamber 7. A battery 27 as a power source for the camera 2 is held in a not-shown battery chamber that is provided on the bottom side of the camera body 3 between the cartridge chamber 7 and the film chamber. The battery chamber is closed by a battery chamber lid 28.

A cutout 4a is formed in a bottom wall of the sliding cover 4 in connection to the open side. The bottom cutout 4a entirely uncovers the cartridge chamber lid 6 and thus permits opening the cartridge chamber 7 when the sliding cover 4 is slid to the cartridge exchange position. When the sliding cover 4 is in the work position or in the rest position, the bottom wall of the sliding cover 4 overlaps the cartridge chamber lid 6, so the cartridge chamber lid 6 would not open in these positions. Since a distal portion of the cartridge chamber lid 6 is kept in contact with the bottom wall of the sliding cover 4 until the sliding cover 4 reaches the cartridge exchange position, a clearance between the sliding cover 4 and the camera body 3 would hardly open the cartridge chamber lid 6. Because of the bottom cutout 4a, the sliding cover 4 does not cover the battery chamber lid 28 even in the rest position, so it is possible to replace the battery 27 in the rest position.

A cam plate 33 is mounted on inside of a rear wall of the sliding cover 4 along a top marginal portion thereof. In correspondence with the cam plate 33, three locking claws 34, 35 and 36 protrude from the back side wall of the camera body 3. Below the locking claws 34 to 36, a coupling gear 75 partly protrudes through an opening 3a of the back side wall of the camera body 3. The coupling gear 75 is engaged with a pair of teeth 32a and 32b that are formed on a bottom edge of a bottom protrusion 33d of the cam plate 33. The teeth 32a and 32b constitute a driving rack 32.

The locking claw 34 constitutes a part of cover locking mechanism for locking the sliding cover 4 at the work position. The unlocking member 15 is operated manually to unlock the cover locking mechanism. The locking claw 34 is engaged in a slit 33c of the cam plate 33 that extends in the sliding direction of the sliding cover 4. The locking claw 34 comes into contact with an end of the slit 33c when the sliding cover 4 moves from the rest position to the work position, stopping the sliding cover 4 at the work position. By operating the unlocking member 15, the locking claw 34 is pulled into the camera body 3 and is disengaged from the slit 33c. Then the sliding cover 4 is allowed to slide further in an uncovering direction.

The second locking claw 35 is for preventing the sliding cover 4 from sliding to the cartridge exchange position. On the way of the sliding cover 4 from the work position to the cartridge exchange position, the locking claw 35 comes into contact with a side edge 33e of the bottom protrusion 33d of the cam plate 33, so the sliding cover 4 stops at this position, i.e. the safety lock position. The locking claw 35 is protruded out of the camera body 3 is pulled into the camera body 3 in an unlocking process as set forth in detail later.

The third locking claw 36 stops the sliding cover 4 from slipping off the camera body 3 after the sliding cover 4 reaches the cartridge exchange position. The locking claw 36 fixedly protrudes out of the camera body 3 except when the camera 2 is subjected to a maintenance treatment or a repair.

Figure 5:
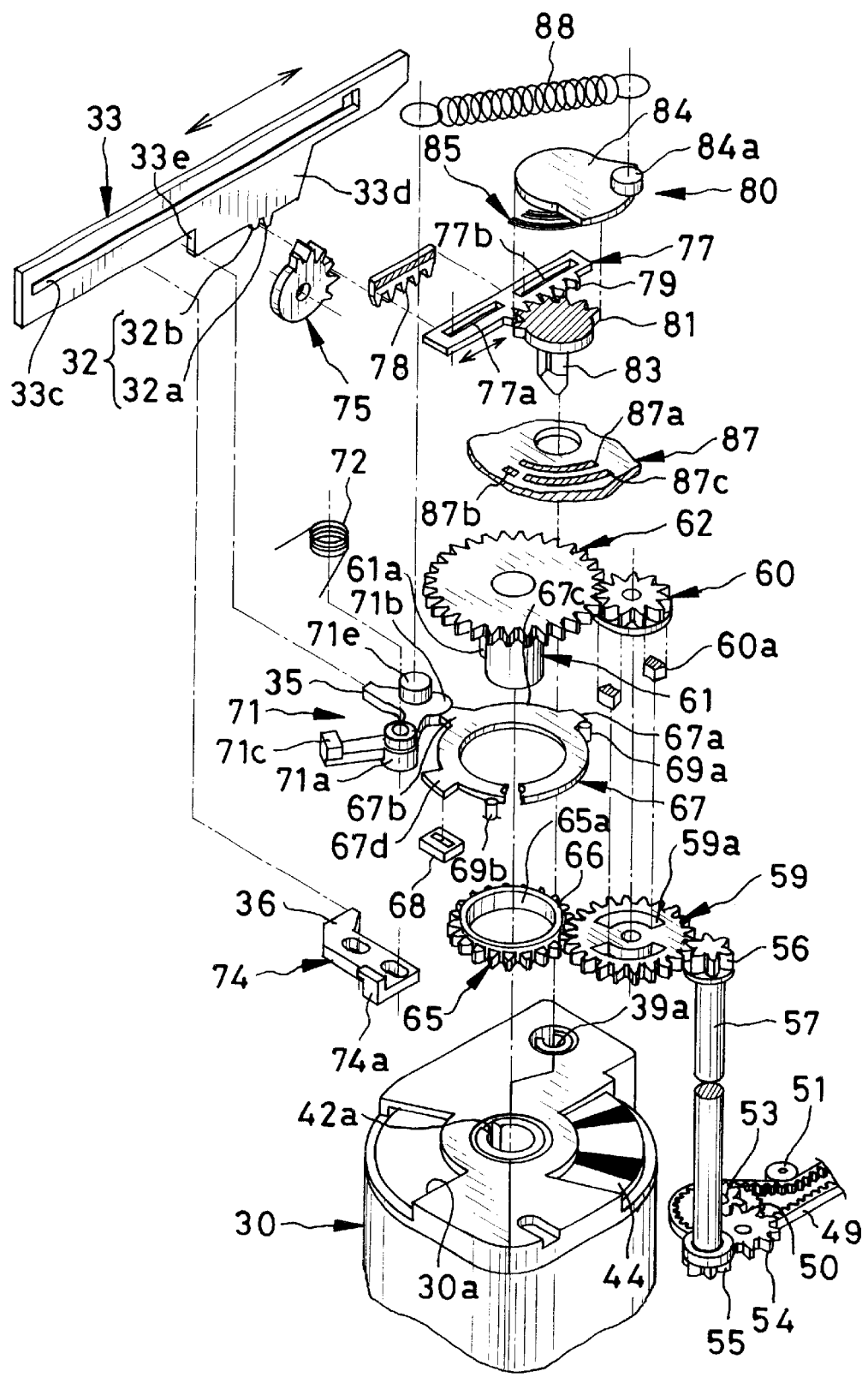
FIG. 5 is an exploded perspective view illustrating a film feeding mechanism, a safety lock mechanism and a door driving mechanism of the camera.

As shown in detail in FIG. 5, a spool 42 of the photo film cartridge 8 has an engaging hole 42a in either end face thereof, and the end faces of the spool 42 are exposed to the outside of the cartridge shell 30, so a spool drive shaft 61 of the camera 2 is engaged in the engaging hole 42a. Although it is not shown in the drawings, the IX240 type photo film cartridge 8 has an internal film advancing mechanism for causing the photo filmstrip 31 to advance out of the cartridge shell 30 through a film port 30b (see FIGS. 6A to 6C) responsive to the spool 42 being rotated in an unwinding direction.

Figure 6A:
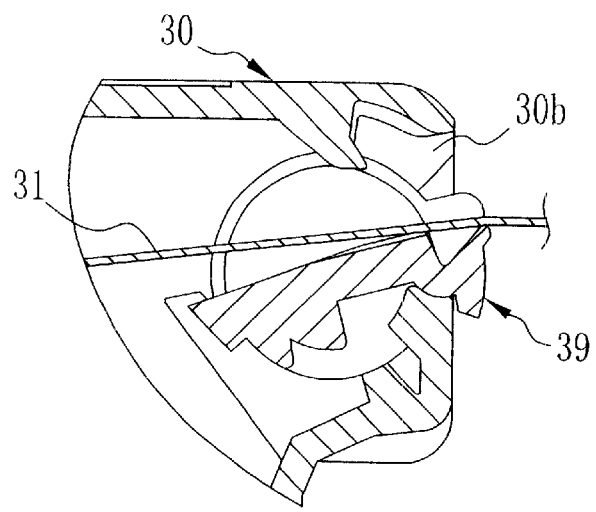
FIGS. 6A, 6B and 6C are sectional views illustrating the operation of a door member of an IX240 type photo film cartridge.
Figure 6B:
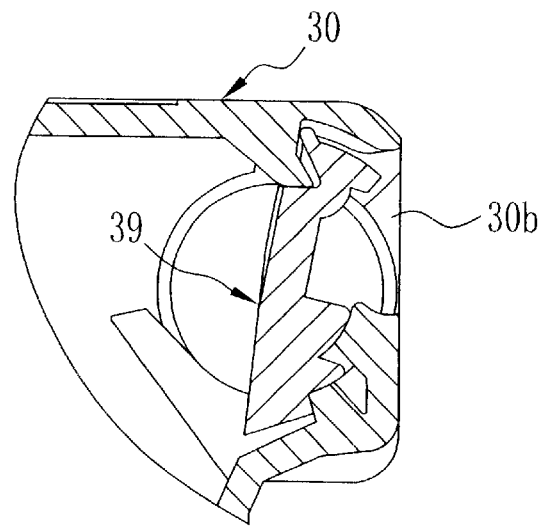
Figure 6C:
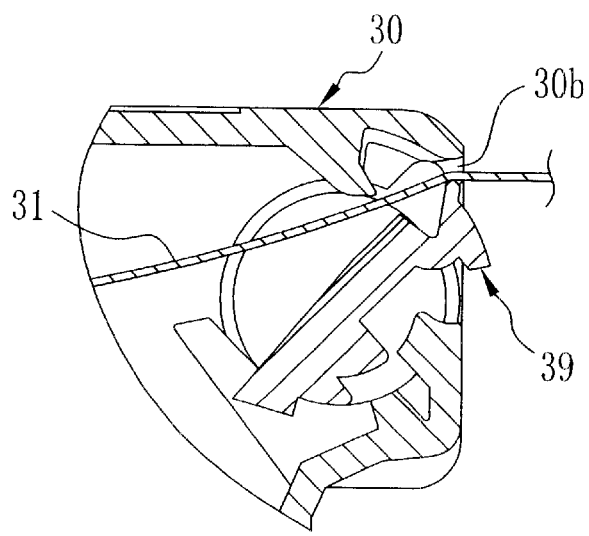

The door member 39 is disposed inside the film port 30b. The door member 39 has a rod-like shape with a flat middle portion, as shown in FIGS. 6A to 6C. The door member 39 is pivoted on an axis that extend in parallel to the spool 42 to rotate between a closed position as shown in FIG. 6A, and an open position as shown in FIG. 6B. Although it is not shown in the drawings, a spool locking mechanism is mounted inside the cartridge shell 31 to lock the spool 42 while the door member 39 is in the closed position. Opposite ends of the door member 39 are exposed to the outside of the cartridge shell 30, so a door drive shaft 83 of the camera 2 may be engaged in an engaging hole 39a of the door member 39.

Figure 7:
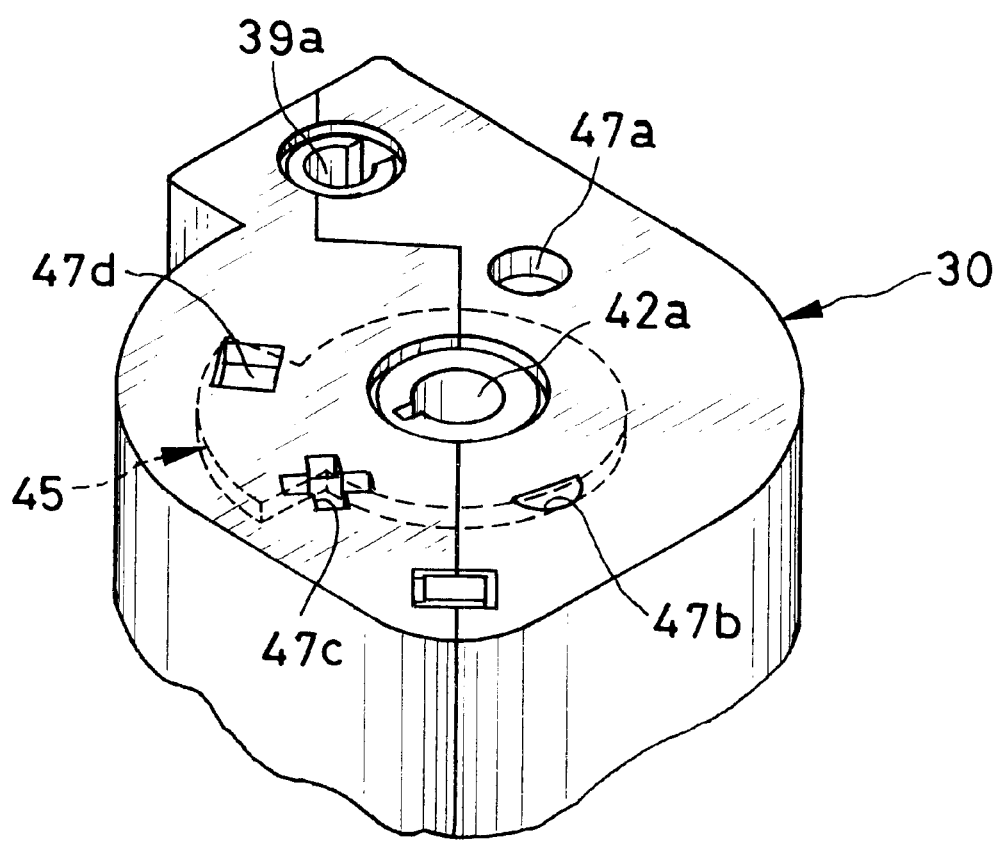
FIG. 7 is a fragmental perspective view of the photo film cartridge, illustrating an index disc for indicating condition of usage of the cartridge.

As shown in FIGS. 5 and 7, a data disc 44 and an index disc 45 are securely mounted on the opposite ends of the spool 42. On a outer side of the data disc 44 is provided a bar code representative of film data of the photo filmstrip 31, including film type, film speed, the number of available frames. The bar code is exposed through cutouts 30a that is formed through an end face of the cartridge shell 30, so a bar code reader of the camera 2 may read the bar code.

The index disc 45 is for indicating condition of usage of the photo film cartridge 8. As shown in FIG. 7, the index disc 45 has a sector of a larger radius, whereas four index openings 47a, 47b, 47c and 47d of different shapes are formed through another end face of the cartridge shell 30 around a circular course of the sector of the index disc 45. If the index disc 45 is visible through the round opening 47a, it shows that the photo film cartridge 8 has never been used. If the index disc 45 is visible through the semi-circular opening 47b, it shows that the photo filmstrip 31 of the photo film cartridge 8 has been partly exposed. If the index disc 45 is visible through the cross-shaped opening 47c, it shows that the photo filmstrip 31 of the photo film cartridge 8 has been fully exposed. If the index disc 45 is visible through the rectangular opening 47d, it shows that the photo filmstrip 31 of the photo film cartridge 8 has been developed.

The photo filmstrip 31 has a photosensitive layer on one side thereof, and a transparent magnetic recording layer on the other side thereof, so it is possible to write and read data of various kinds on the magnetic recording layer in association with photographed frame.

Figure 8:
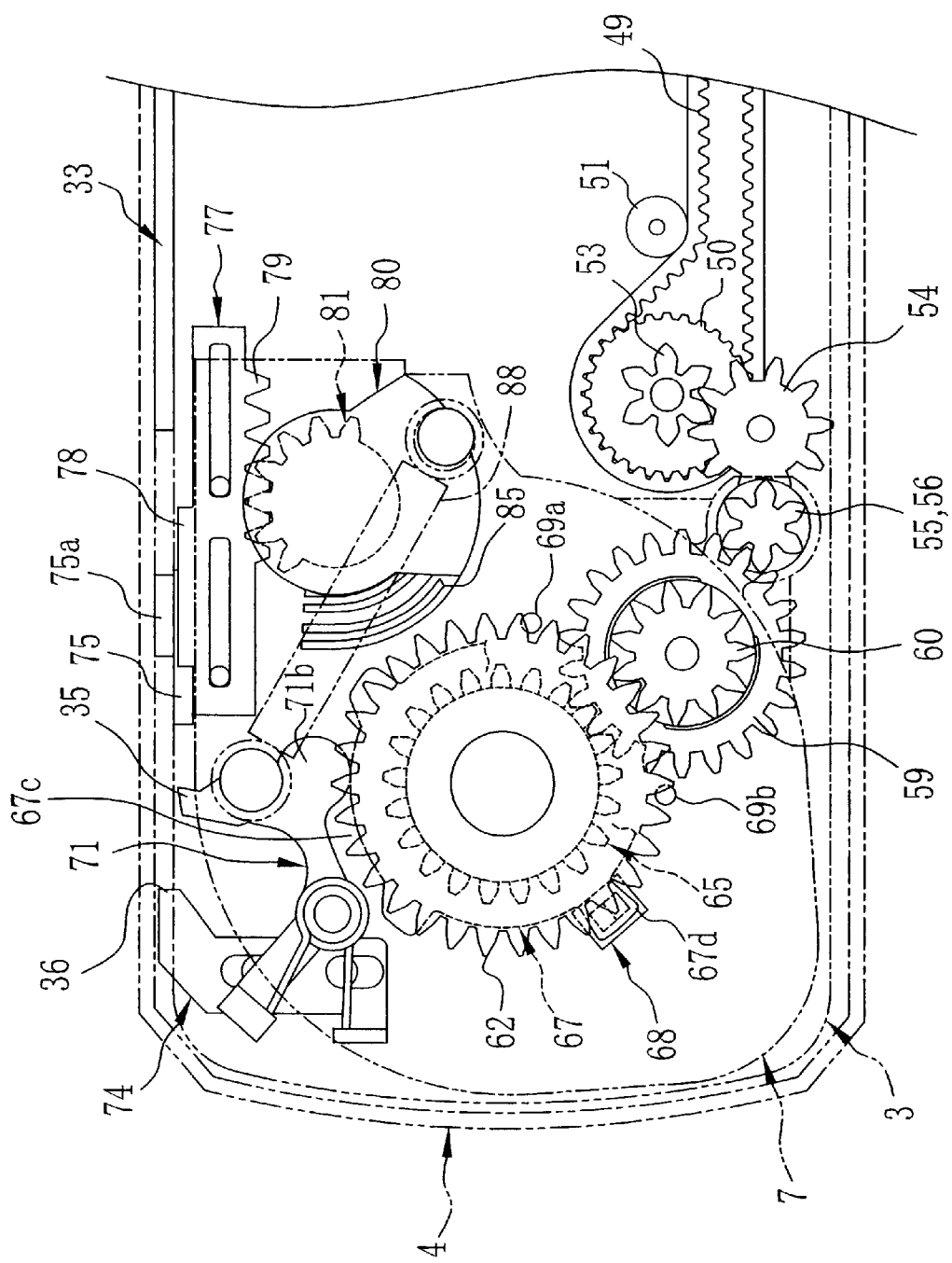
FIG. 8 is a top plan view illustrating the film feeding mechanism, the safety lock mechanism and the door driving mechanism of the embodiment of FIG. 5, in a position where the photo film cartridge is not loaded and the sliding cover is closed.

Referring now to FIGS. 5 and 8 illustrating mechanisms of the camera 2 disposed above and around the cartridge chamber 7. A gear belt 49 made of an elastic material is suspended between a pair of sprockets 50, one of which is disposed at a lower position near the cartridge chamber 7, whereas the other sprocket is not shown but disposed at a lower position nearer to the film chamber. The not-shown sprocket 50 is driven by a feed motor 52 (see FIG. 20) through a plurality of reduction gears which may have a conventional construction, so is omitted from the drawings. The feed motor 52 is mounted in the film chamber. Designated by 51 is a tension pulley for ensuring engagement between the gear belt 49 and the sprockets 50.

A first gear 53 of a small diameter is formed integrally on the sprocket 50, and the first gear 53 meshes with a second gear 52. A connection axle 57 with a third gear 55 and a fourth gear 56 on its opposite ends is mounted vertically along one side of the cartridge chamber 7. The third and fourth gears 55 and 56 rotates together with the connection axle 57. The third gear 55 meshes with the second gear 54.

Figure 9:
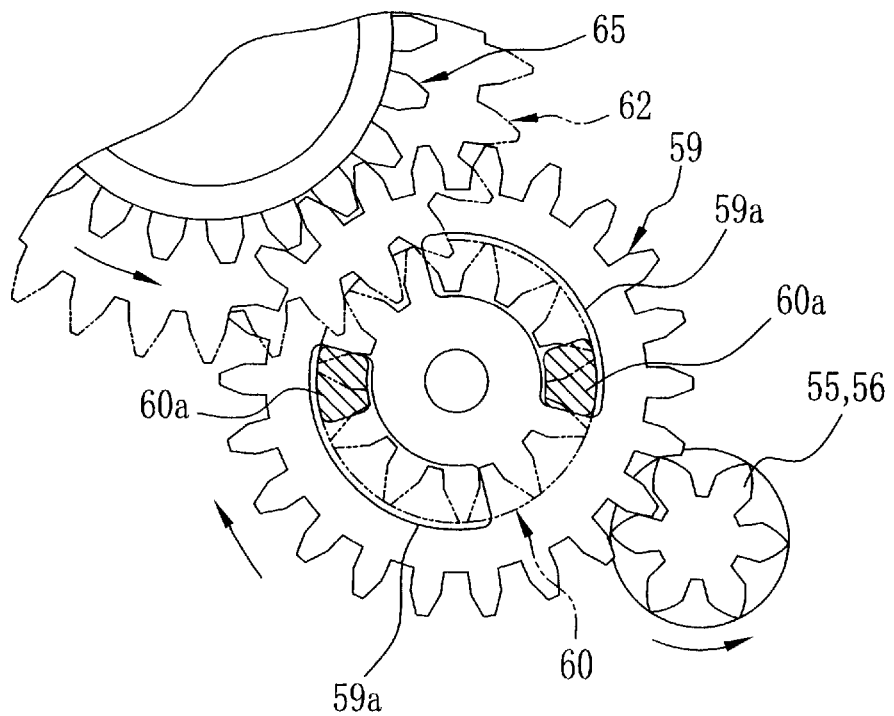
FIG. 9 is a top plan view illustrating a position of a transmission delaying mechanism of the film feeding mechanism at the start of a rewinding operation of a photo filmstrip into a cartridge shell of the cartridge.
Figure 10:
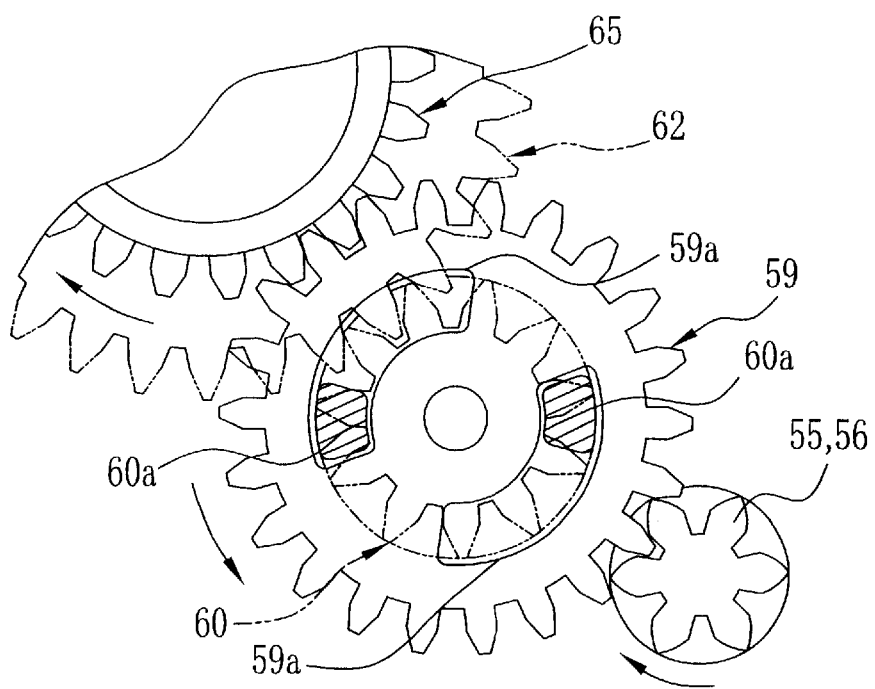
FIG. 10 is a top plan view illustrating a position of the transmission delaying mechanism at the start of an advancing operation of the photo filmstrip out of the cartridge shell.

The fourth gear 56 meshes with a fifth gear 59 that is pivoted on a top wall of the cartridge chamber 7. In this way, the rotational movement of the feed motor 52 is transmitted to the fifth gear 59. A sixth gear 60 is mounted on a top side of the fifth gear 59 in coaxial to each other. The sixth gear 60 has a pair of engaging projections 60a formed integrally on its bottom side, the engaging projections 60a being rotationally symmetrical. On the other hand, the fifth gear 59 has a pair of sectorial cutouts 59a for accepting the engaging projections 60a, as shown in FIGS. 9 and 10. The engaging projections 60a slide along the sectorial cutouts 59a as the fifth gear 59 rotates through a limited angular range that is defined by the sectorial cutouts 59a. Therefore, the rotational movement of the fifth gear 59 is not transmitted to the sixth gear 60 until the engaging projections 60a of the sixth gear 60 is brought into contact with one or the other end of the sectorial cutout 59a of the fifth gear 59 in either rotational direction. Accordingly, the rotational movement of the feed motor 52 is transmitted to the spool 42 with a predetermined delay when the rotational direction is switched over. Thus, the engaging projections 60a and the sectorial cutouts 59a constitute a delaying mechanism.

The sixth gear 60 meshes with a seventh gear 62 of a large diameter, and the spool drive shaft 61 to be engaged in the engaging hole 42a of the spool 42 is formed integrally on a bottom side of the sixth gear 60. Thus, the elements 49 to 57, 59 to 62 constitute a film feeding mechanism 63. A key projection 61a is provided on a peripheral portion of the spool drive shaft 61, so as to be resiliently pushed into the spool drive shaft 61. As the key projection 61a is fitted in a key groove of the engaging hole 42a, the rotational movement of the spool drive shaft 61 is transmitted to the spool 42.

The photo filmstrip 31 is rewound into the cartridge shell 30 by rotating the seventh gear 62 in a counterclockwise direction in the drawings, and is advanced from the cartridge shell 30 by rotating the seventh gear 62 in a clockwise direction. When the third and fourth gear 55 and 56 are rotated in the counterclockwise direction to rotate the seventh gear 62 in the counterclockwise direction, the fifth gear 59 is rotated in the clockwise direction by the rotation of the fourth gear 56. When the third and fourth gear 55 and 56 are rotated in the clockwise direction to rotate the seventh gear 62 in the clockwise direction, the fifth gear 59 is rotated in the counterclockwise direction by the rotation of the fourth gear 56.

The fifth gear 59 meshes with an eighth gear 65 that is disposed below the seventh gear 62. The eighth gear 65 has an coaxial round opening 65a for fitting the eighth gear 65 pivotally on a boss that is not shown but formed on the top wall of the cartridge chamber 7. Through the boss, the spool drive shaft 61 formed integrally with the seventh gear 62 is inserted in the engaging hole 42a of the spool 42. The eighth gear 65 has a circular engaging rim 66 protruding upward from its top side. On the engaging rim 66 is fitted an open friction ring 67 that is made of a metal blade or the like. Because the friction ring 67 is coupled to the engaging rim 66 by friction, if a certain load is applied to the friction ring 67 while the eighth gear 65 is turning, the friction ring 67 slips on the engaging rim 66, and the eighth gear 65 alone continues rotating.

The friction ring 67 is an integral part having a pair of locking cam protuberances 67a and 67b, an unlocking cam surface 67c between the locking cam protuberances 67a and 67b, and a third protuberance 67d. A pair of stopper pins 69a and 69b are disposed on the top wall of the cartridge chamber 7 in contact with the peripheral surface of the friction ring 67. The cam protuberance 67a or the third protuberance 67d comes to contact with the stopper pin 69a or 69b respectively after the friction ring 67 rotates in one or the other direction. Thus, the rotational range of the friction ring 67 is limited to a predetermined angle.

The second locking claw 35 is formed integrally with a locking lever 71 that is pivotally mounted on one side of the friction ring 67. Besides the locking claw 35, the locking lever 71 has a substantially cylindrical pivotal portion 71a, a cam portion 71b that is contacted with the peripheral surface of the friction ring 67, and a projection 71c for holding one end of a coiled spring 72. The coiled spring 72 is fitted on the pivotal portion 71a of the locking lever 71 to urge the locking lever 71 to rotate clockwise in FIG. 5, so the cam portion 71b is kept in contact with the peripheral surface of the friction ring 67. The locking lever 71 and the friction ring 67 constitute a safety lock mechanism 73.

Another end of the coiled spring 72 is caught on a projection 74a of a locking plate 74. The locking plate 74 has the third locking claw 36 as an integral part, and is fixedly mounted on the top wall of the cartridge chamber 7 such that the claw 36 protrudes outside the camera body 3. When to retract the locking claw 36, a bolt fastening the locking plate 74 to the top wall of the cartridge chamber 7 is removed from inside the cartridge chamber 7, so the locking plate 74 is pulled into the camera body 3 according to the urging force of the coiled spring 72.

As described above, while the locking claw 35 is protruded out of the camera body 3, the side edge 33e of the bottom protrusion 33d of the cam plate 33 of the sliding cover 4 stops against the locking claw 35, to stop the sliding cover 4 at the safety lock position.

Figure 11:
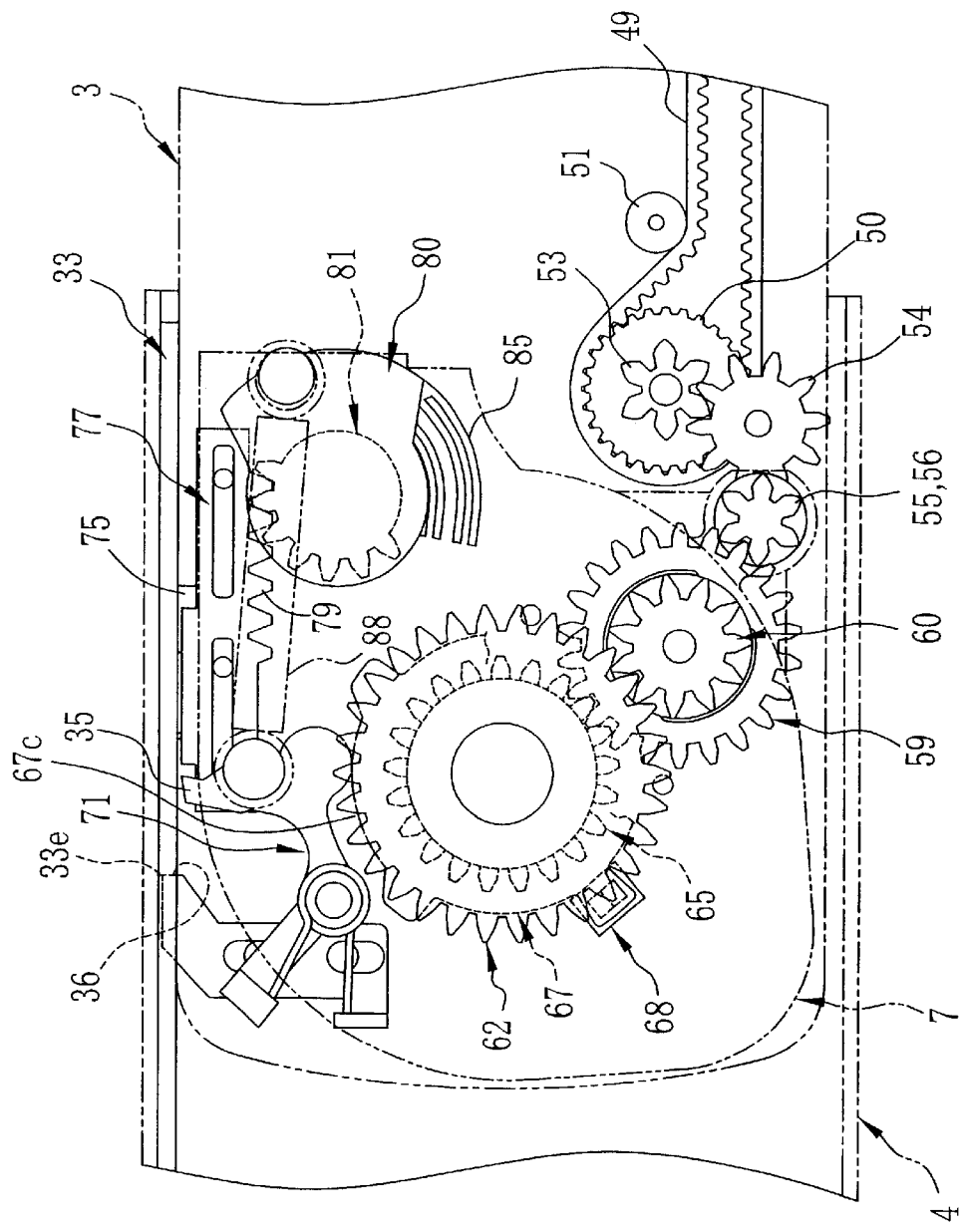
FIG. 11 is a similar view to FIG. 8 but illustrating the mechanisms in a position where the sliding cover is in the cartridge exchange position.

The friction ring 67 is determined to stop at three positions by the stopper pins 69a and 69b and by stopping the feed motor 52. The first stop position of the friction ring 67 is an unlock position as shown in FIG. 8, where the unlocking cam surface 67c is in contact with the cam portion 71b of the locking lever 71 and thus the locking claw 35 is retracted into the camera body 3. In the unlock position, the third protuberance 67d is detected by a photo reflective type unlock position sensor 68 that is disposed below the friction ring 67. Since the locking claw 35 is located inside the camera body 3 in this unlock position, the sliding cover 4 is not stopped at the safety lock position, but may be slid to the cartridge exchange position as shown in FIG. 11, where the side edge 33e of the bottom protrusion 33d of the cam plate 33 comes to contact with the third locking claw 36.

Figure 12:
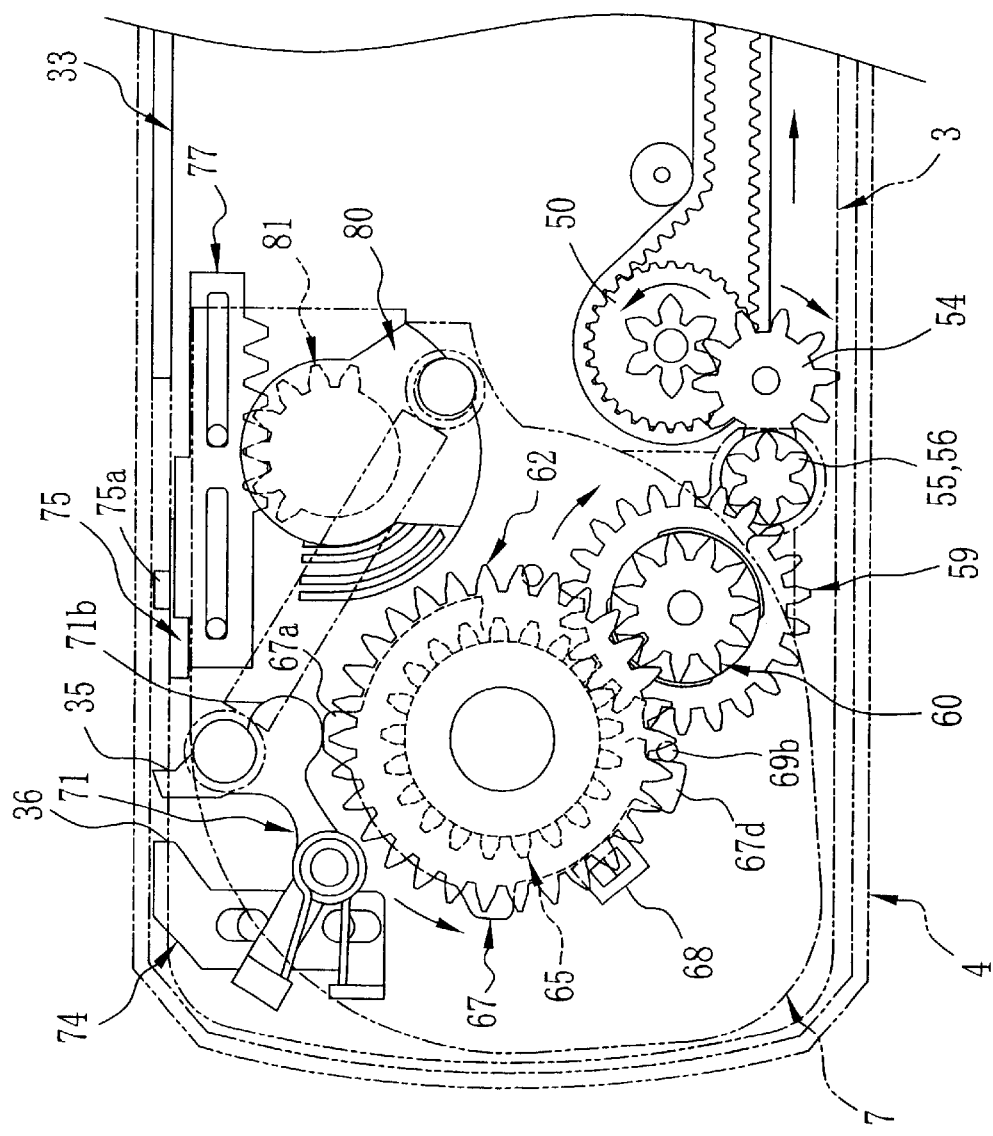
FIG. 12 is a similar view to FIG. 8 but illustrating the mechanisms during a preliminary checking process where a spool of the photo film cartridge is rotated in the rewinding direction prior to advancing the photo filmstrip from the photo film cartridge.

The second stop position of the friction ring 67 is a lock position as shown in FIG. 12, where the third protuberance 67d of the friction ring 67 is in contact with the stopper pin 69b, and the locking cam protuberance 67a is in contact with the cam portion 71b of the locking lever 71. In this position, the second locking claw 35 is protruded outside the camera body 3.

Figure 13:
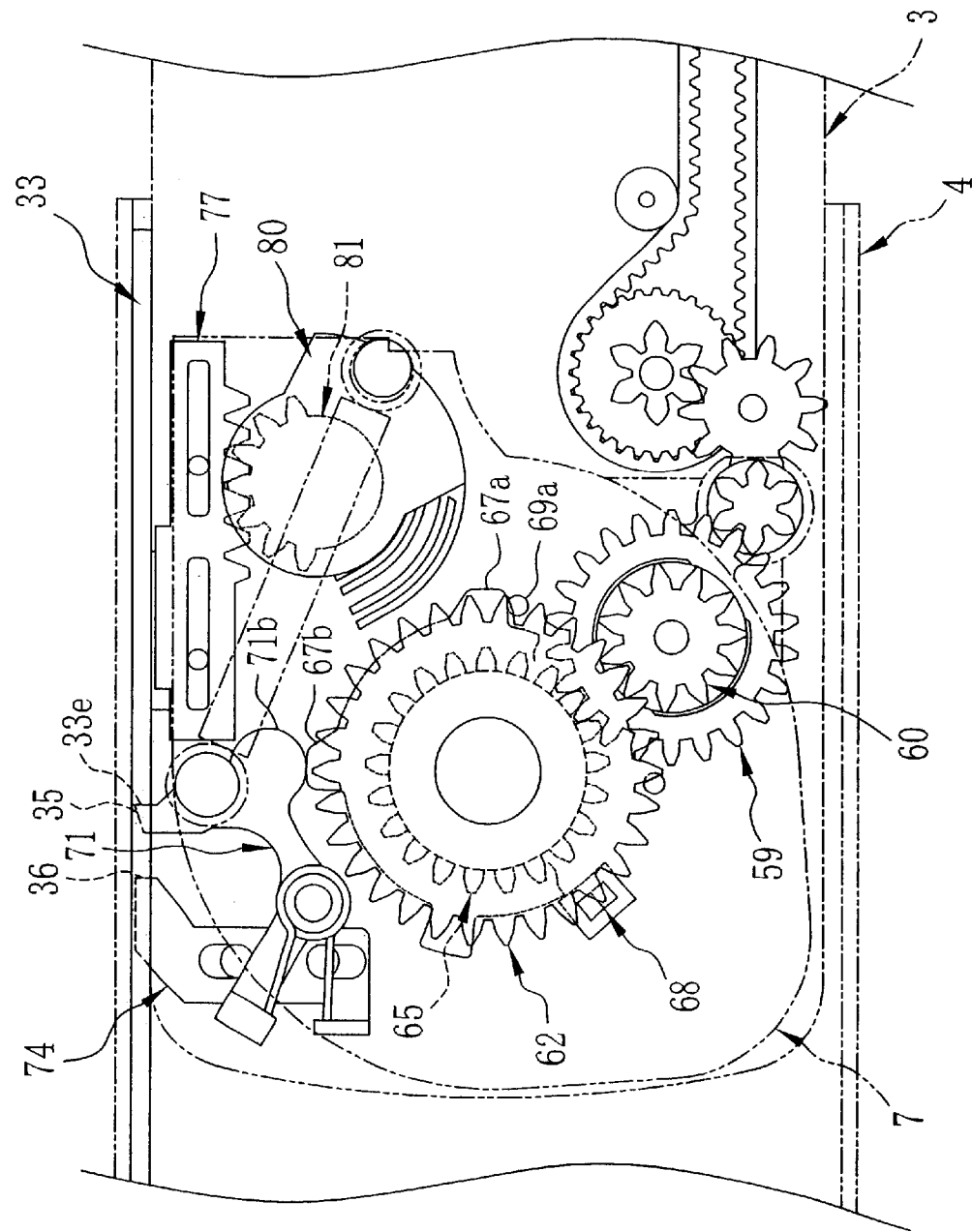
FIG. 13 is a similar view to FIG. 8 but illustrating the mechanisms in a position where the sliding cover is locked at a safety lock position between the work position and the cartridge exchange position.

Therefore, if the sliding cover 4 is slid toward the cartridge exchange position, the side edge 33e strikes against the locking claw 35, as shown in FIG. 13, stopping the sliding cover 4 from moving to the cartridge exchange position.

Figure 14:
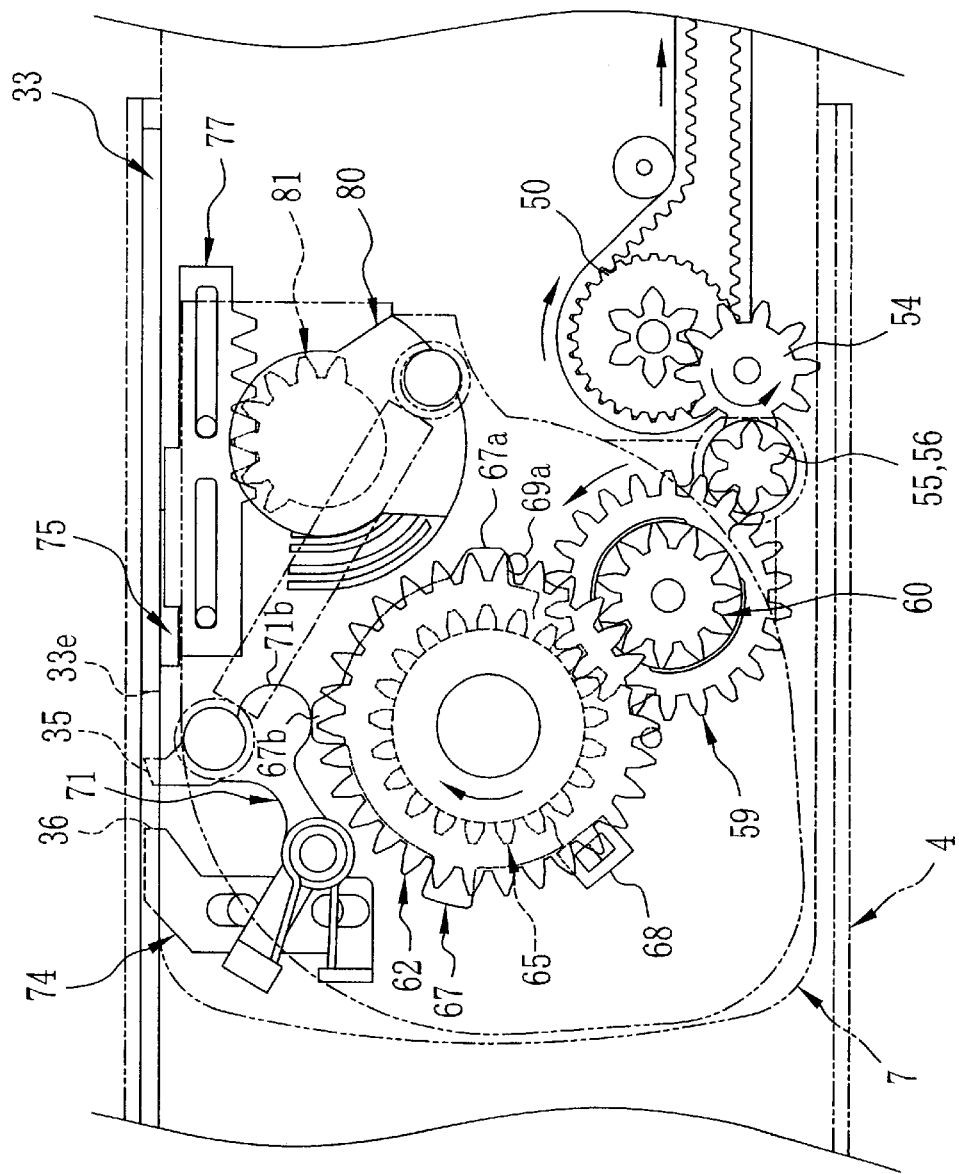
FIG. 14 is a similar view to FIG. 8 but illustrating the mechanisms in a position where the sliding cover is in the work position and the photo filmstrip is being advanced.

The third stop position of the friction ring 67 is a lock position as shown in FIGS. 13 and 14, where the locking cam protuberance 67a is in contact with the stopper pin 69a, and the second locking cam protuberance 67b is in contact with the cam portion 71b of the locking lever 71. Since the locking claw 35 is protruded outside the camera body 3, the sliding cover 4 is prevented from sliding to the cartridge exchange position also in the third stop position of the friction ring 67.

Figure 15:
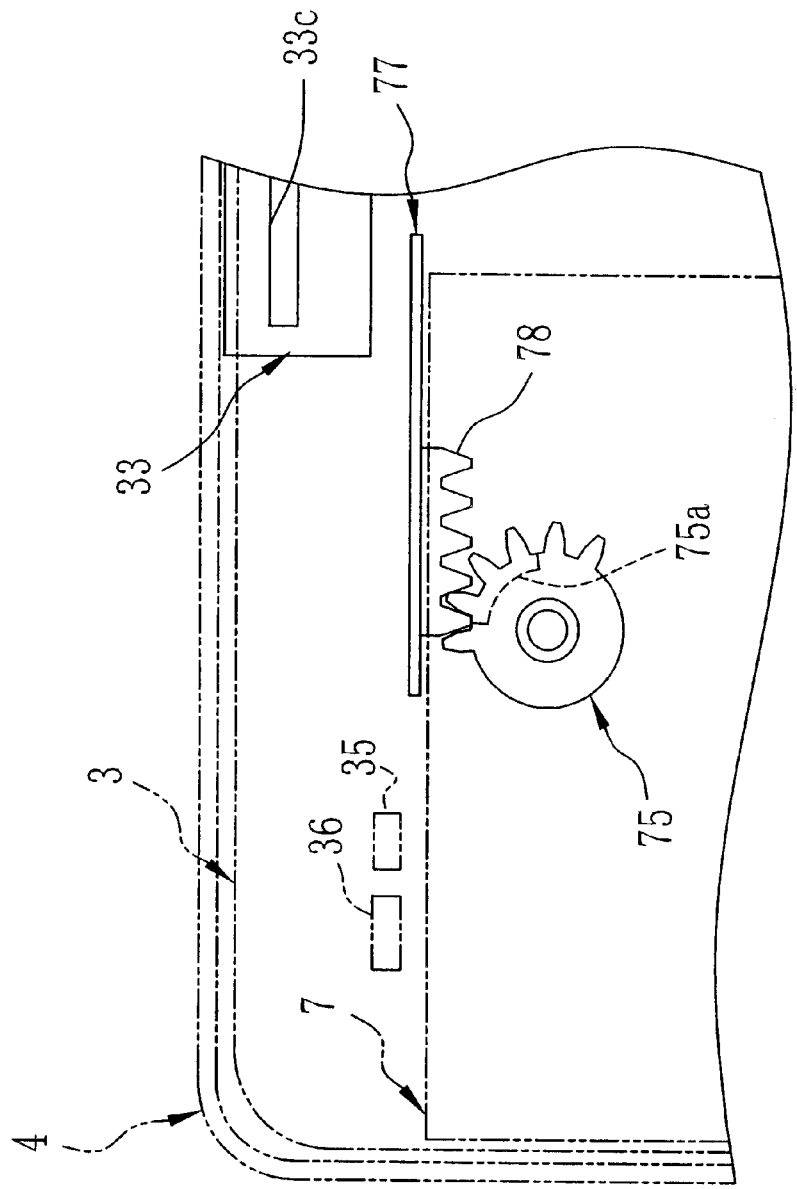
FIG. 15 is a front view illustrating the door driving mechanism in the rest position of the sliding cover.

Reference is made to FIGS. 5 and 15 for showing a door driving mechanism that is constituted of the driving rack 32, the coupling gear 75, an interconnection rack plate 77, and a door rotating member 80. Because the coupling gear 75 does not need to turn 360 degrees, it has six teeth in a limited angular range. Among of the six teeth, intermediate three teeth 75a (see FIG. 15) have a longer face width than the others, and 25 protrude out through the opening 3a of the camera body 3 and mesh with one tooth 32b of the driving rack 32. The one tooth 32b is set lower than the other tooth 32a of the driving rack 32, for facilitating engagement with the teeth 75a.

A vertical rack 78 formed integrally with the interconnection rack plate 77 is also engaged with the coupling gear 75. The interconnection rack plate 77 has two slits 77a and 77b along the sliding direction of the sliding cover 4, and is mounted on the cartridge chamber 7 with the slits 77a and 77b fitted on pins. The pins are formed on the top wall of the cartridge chamber 7 such that the interconnection rack plate 77 may slide on the cartridge chamber 7 in parallel to the sliding direction of the sliding cover 4. The interconnection rack plate 77 is also formed integrally with a horizontal rack 79, and the horizontal rack 79 is engaged with a pinion 81 that is formed integrally with the door rotating member 80.

The door rotating member 80 has the door drive shaft 83 to be engaged in the engaging hole 39a of the door member 39, the pinion 81, and a bearing disc 84, which are formed on atop another as an integral part. A brush 85 made of a metal blade is secured to a bottom of the bearing disc 84. The brush 85 brushes on a printed circuit board 87 that is mounted on the top wall of the cartridge chamber 7.

A coiled spring 88 is bridged between a pin 84a on the bearing disc 84 and a pin 71e on the locking lever 71. This spring 88 works as a toggle spring that urges the door member 39 either to the closed position or to the open position depending upon rotational position of the door rotating member 80.

The door member 39 is caused to move between the closed position and the open position by a small amount of sliding movement of the sliding cover 4 between the work position and the cartridge exchange position in the way as set forth below.

When the sliding cover 4 is in the rest position, as shown in FIGS. 8 and 15, the driving rack 32 of the cam plate 33 is not engaged with the coupling gear 75, and the door rotating member 80 is held in the open position of the door member 39.

Figure 16:
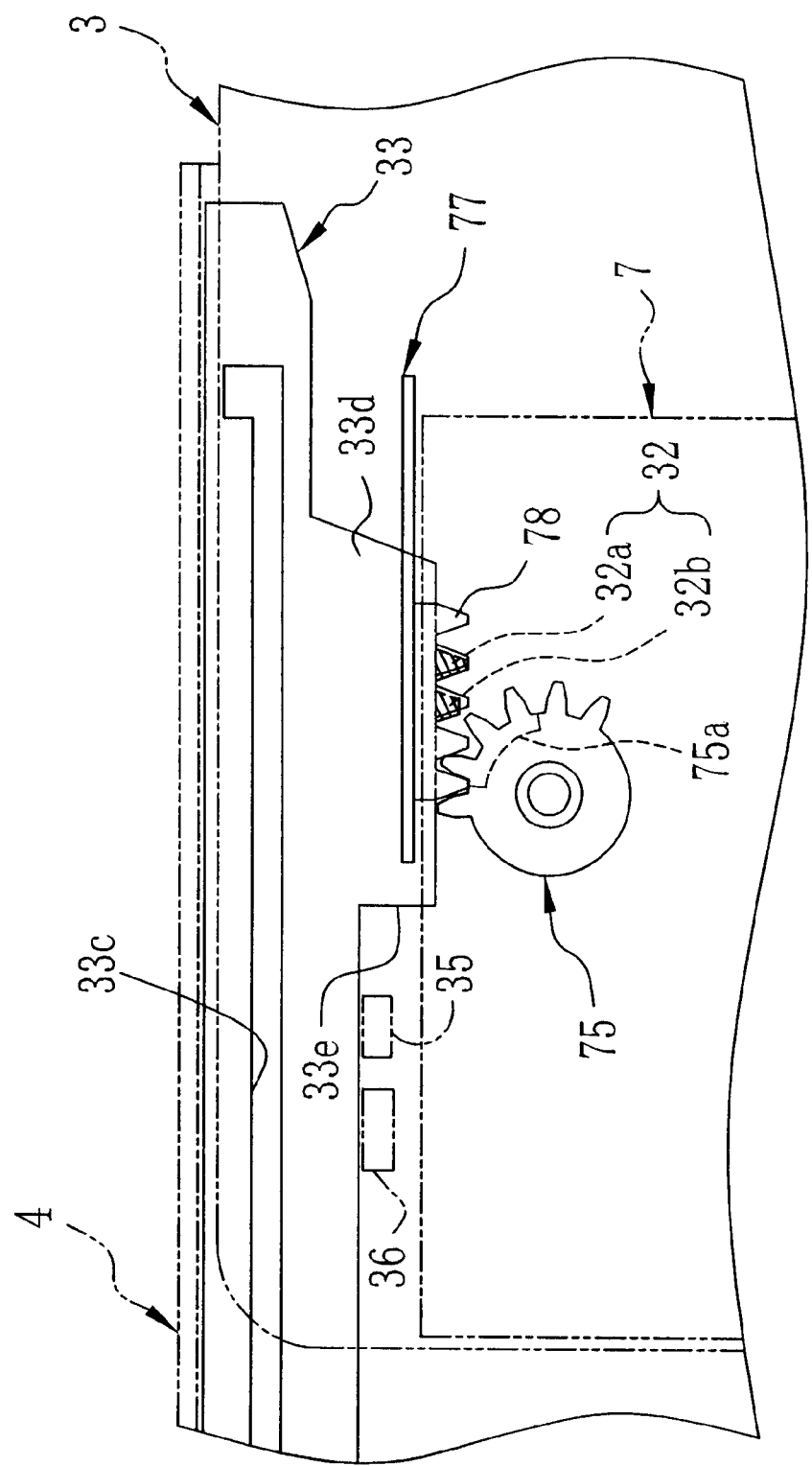
FIG. 16 is a front view illustrating the door driving mechanism in the work position of the sliding cover.
Figure 17:
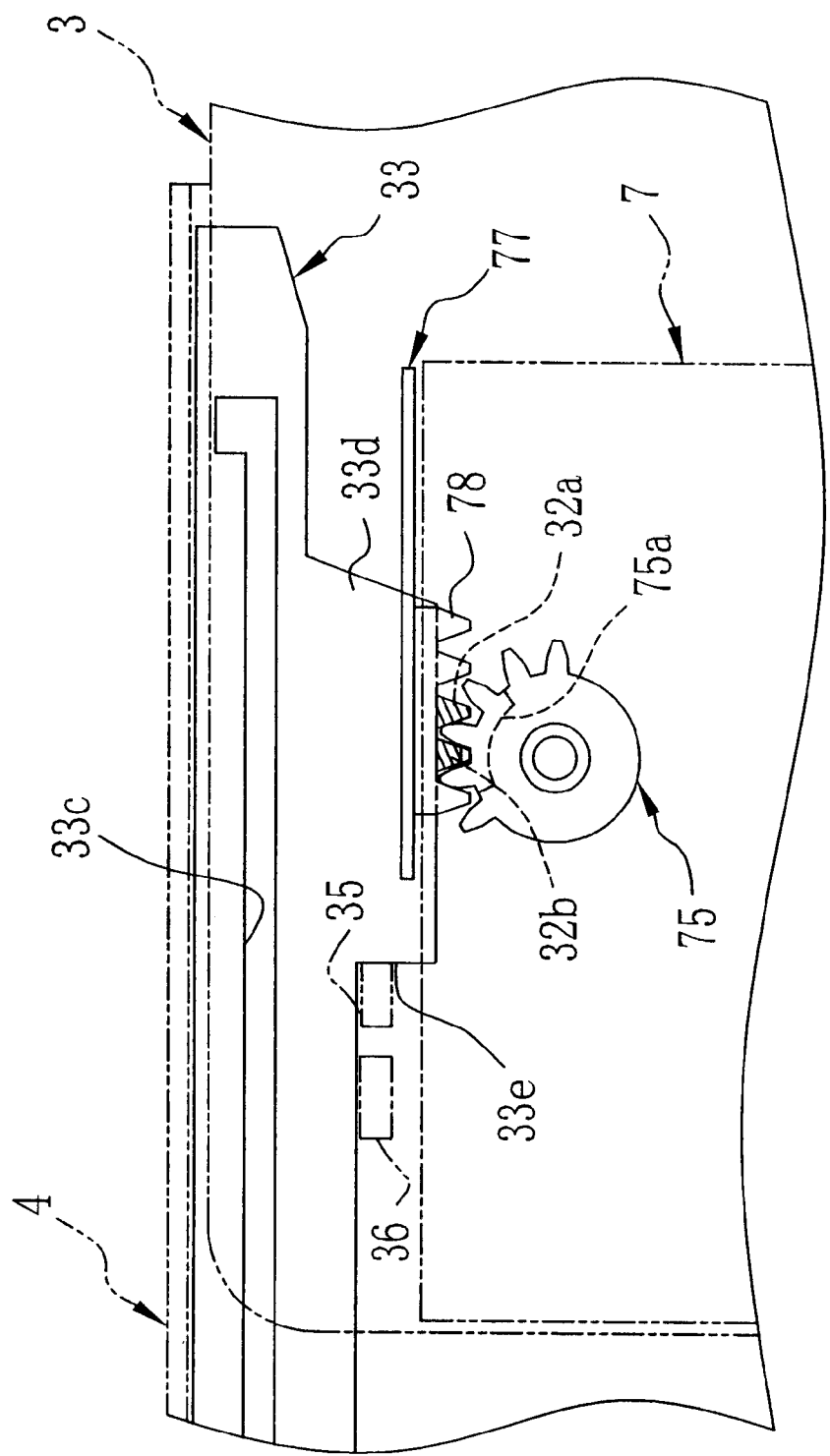
FIG. 17 is a front view illustrating the door driving mechanism in the safety lock position.
Figure 18:
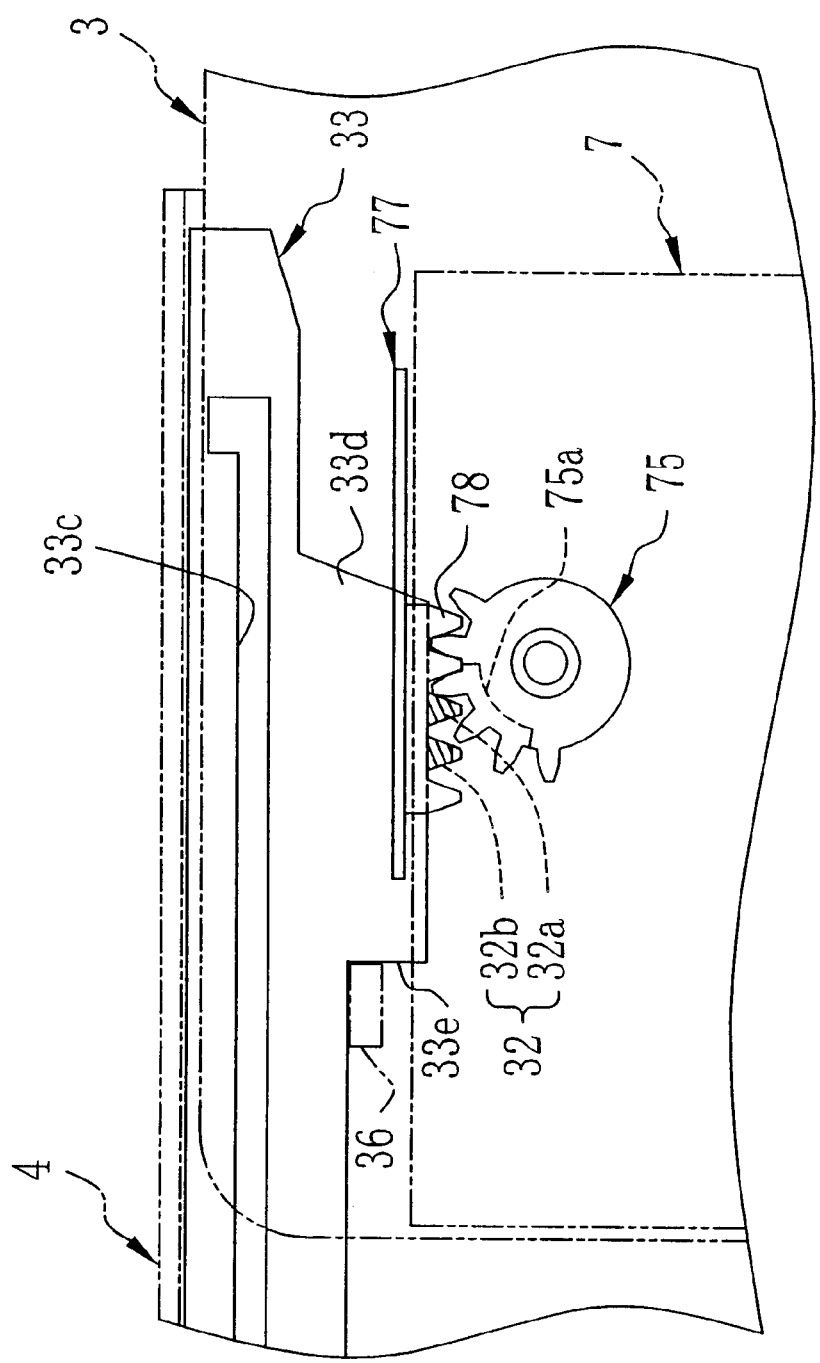
FIG. 18 is a front view illustrating the door driving mechanism in the cartridge exchange position.

When the sliding cover 4 slides to the work position, the driving rack 32 comes to a position shown in FIG. 16. In FIG. 16 to FIG. 18, the teeth 32a and 32b of the driving rack 32 are provided with hatching for the sake of distinguishing from the vertical rack 78.

While the sliding cover 4 is sliding from the work position to the cartridge exchange position, as shown in FIGS. 17 and 18, the driving rack 32 comes into engagement with the coupling gear 75, so the coupling gear 75 is rotated in the counterclockwise direction in the drawings by the movement of the sliding cover 4 in the uncovering direction. The interconnection rack plate 77 also slides in the same direction as the sliding cover, i.e. to the left in the drawings, because of the engagement between the vertical rack 78 and the coupling gear 75. Because of the engagement of the horizontal rack 79 with the pinion 81, the door rotating member 80 rotates in the counterclockwise direction in FIG. 11. As shown in FIGS. 6A and 6B, the counterclockwise rotation of the door rotating member 80 makes the door member 39 rotate to the closed position where the film port 30b of the photo film cartridge 8 is closed.

When the door rotating member 80 rotates halfway in the counterclockwise direction, the urging direction of the coiled spring 88 is switched to the counterclockwise direction, so the door rotating member 80 rotates counterclockwise according to the force of the spring 88. Thus the door member 39 moves faster than before, and is held to the closed position by the urging force of the spring 88. Thus, the film port 30b is completely closed before the sliding cover 4 reaches the cartridge exchange position, preventing fogging the photo filmstrip 31 with reliability.

Figure 19A:
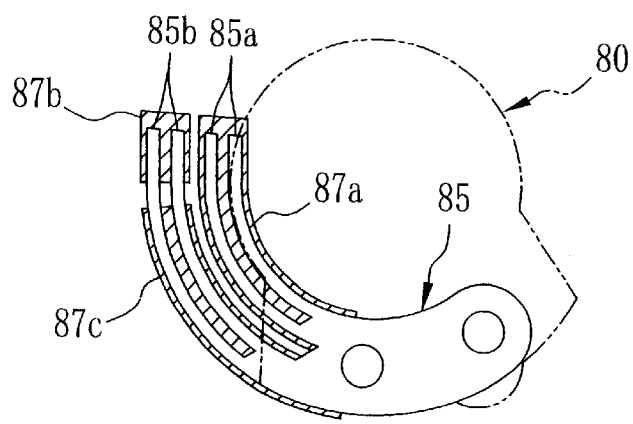
FIGS. 19A, 19B and 19c are explanatory diagrams illustrating the operation of a door position detector switch.
Figure 19B:
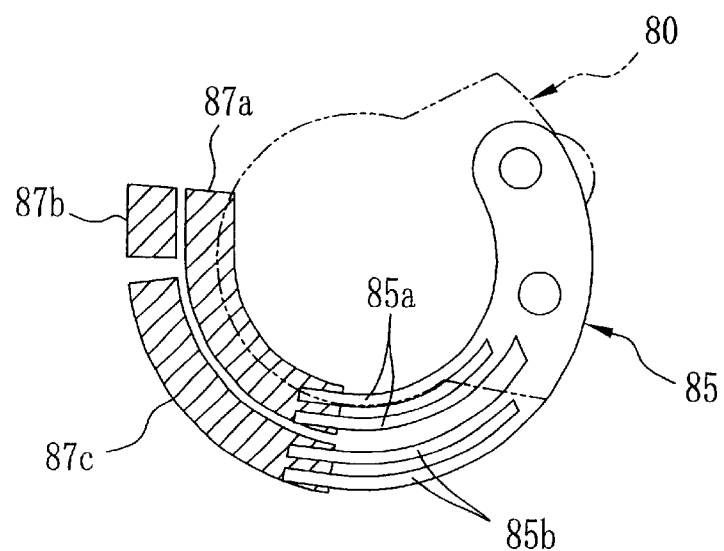
Figure 19C:
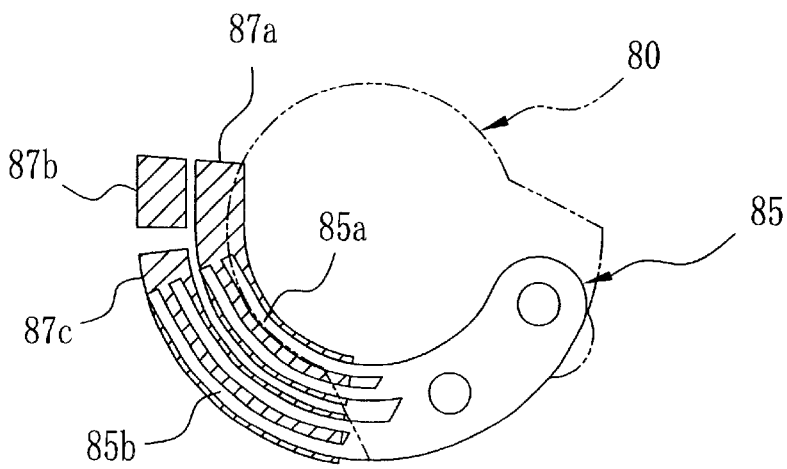

FIG. 19A shows a position of the brush 85 on the door rotating member 80 at the open position of the door member 39, and FIG. 19B shows a position of the brush 85 at the closed position of the door member 39, whereas FIG. 19A shows a position of the brush 85 at the safety lock position of the sliding cover 4. Three contact rails 87a, 87b and 87c are formed on the printed circuit board 87 such that a first pair of contact strips 85a of the brush 85 brush on the first contact rail 87a, while a second pair of contact strips 85b successively brush on the second and third contact rails 87b and 87c. These contact rails 87a to 87c and the brush 85 constitute a door position detector switch 86. Since the rotational position of the door rotating member 80 also represent the position of the sliding cover 4, the door position detector switch 86 doubles as a cover position detector.

The first contact rail 87a is a common contact, so the contact strips 85a is kept in contact with the contact rail 87a at any rotational position of the door rotating member 80. Since the contact strips 85b is in contact with the second contact rail 87b at the open position, the contact rail 87b is connected to the common contact 87a, so a corresponding detection signal is applied to a microcomputer 90 (see FIG. 20). The second contact rail 87b has a remarkably smaller length than the contact rail 87c, so the contact strips 85b are brought into contact with the third contact rail 87c as soon as the door member 39 is moved toward the closed position. Then another kind of detection signal is applied to the microcomputer 90. Thereby, the microcomputer 90 detects that the sliding cover 4 is moved in the uncovering direction from the work position. It is to be noted that the contact strips 85a and 85b are designed to brush the contact rails 87a to 87c in pairs, for the sake of avoiding contact failure.

Figure 20:
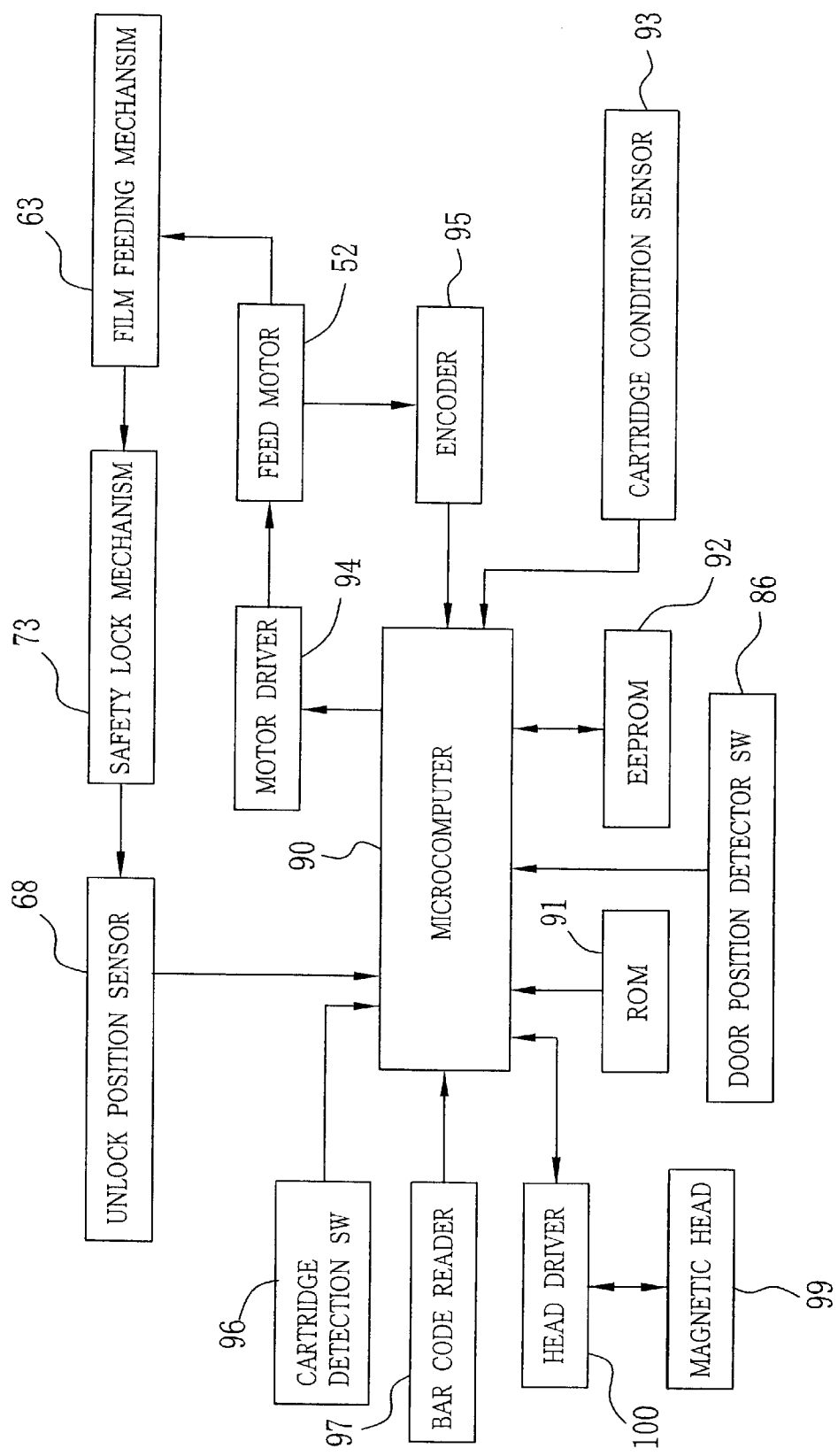
FIG. 20 is a block diagram illustrating an electric construction of the camera relating to the film feeding mechanism and the safety lock mechanism.

Reference is now made to FIG. 20 for showing the electric construction of the camera 2 relating to the film feeding mechanism 63 and the safety lock mechanism 73. To the microcomputer 90 are connected ROM 91, EEPROM 92, so the microcomputer 90 controls overall electric elements of the camera 2 in accordance with control programs and a variety of data stored in the ROM 91, while storing temporary data in the EEPROM 92.

The feed motor 52 is a pulse motor and is driven through a motor driver 94 under the control of the microcomputer 90. Rotation of the feed motor 52 is detected by an encoder 95, and is monitored by the microcomputer 90.

The microcomputer 90 also receives detection signals from the unlock position sensor 68, the door position detector switch 86, a cartridge detection switch 96 that detects when the photo film cartridge 8 is loaded in the cartridge chamber 7, and from a photoelectric cartridge condition sensor 93 for detecting the condition of usage of the photo film cartridge 8 from the rotational position of the index disc 45. The cartridge detection switch 96 and the cartridge condition sensor 93 are mounted inside the cartridge chamber 7. The microcomputer 90 is also fed with the film data from a bar code reader 97 that reads the bar code from the data disc 44 of the photo film cartridge 8, and photographic data from a magnetic head 99 that reads out from the magnetic recording layer on the photo filmstrip 31. The magnetic head 99 is driven through a head driver 100, and writes data on the magnetic recording layer as the photo filmstrip 31 is advanced after each exposure.

Now the operation of the camera 2 of the above embodiment will be described.

Where the sliding cover 4 is in the rest position and the photo film cartridge 8 is not loaded in the cartridge chamber 7, the mechanisms of the camera 2 are located in the positions as shown in FIG. 8. That is, the door rotating member 80 is in the position corresponding to the open position of the door member 39, whereas the friction ring 67 is in the unlock position where the unlocking cam surface 67c is in contact with the cam portion 71b of the locking lever 71. In this position, the transmission delaying mechanism constituted of the fifth and sixth gears 59 and 60 is in the position shown in FIG. 9, and the door driving mechanism is in the position shown in FIG. 15.

When the sliding cover 4 is slid in the uncovering direction under these conditions, the sliding cover 4 is stopped at the work position as shown in FIG. 2, because the first locking claw 34 is engaged with the slit 33c of the cam plate 33 of the sliding cover 4. By operating the unlocking member 15, the first locking claw 34 is pulled into the camera body 3, so the sliding cover 4 is allowed to slide further in the uncovering direction. Since the friction ring 67 is in the unlock position and thus the second locking claw 35 is not protruded from the camera body 3, the sliding cover 4 may reach the cartridge exchange position as shown in FIG. 3, where the side edge 33e of the bottom protrusion 33d of the cam plate 33 strikes against the third locking claw 36, as shown in FIGS. 11 and 18.

As shown in FIGS. 16 to 18, while the sliding cover 4 is sliding from the work position to the cartridge exchange position, the teeth 32a and 32b of the driving rack 32 are engaged with the protruding teeth 75a of the coupling gear 75, so the coupling gear 75 is rotated counterclockwise. The counterclockwise rotation of the coupling gear 75 causes the interconnection rack plate 77 to slide to the left in the drawings through the engagement of the coupling gear 75 with the vertical rack 78. Because of the engagement of the horizontal rack 79 with the pinion 81, the door rotating member 80 rotates in the counterclockwise direction that corresponds to the closing direction of the door member 39. When the sliding cover 4 reaches the cartridge exchange position, the door rotating member 80 moves to the position as shown in FIG. 19B that corresponds to the closed position of the door member 39.

It is to be noted that the camera 2 is designed to turn on the power switch when the sliding cover 4 stays at the work position for a predetermined time. Therefore, the power switch is not uselessly turned on when the sliding cover 4 is slid from the rest position to the cartridge exchange position without stopping at the work position for the predetermined time.

In the cartridge exchange position, the cartridge chamber lid 6 is fully uncovered because of the bottom cutout 4a of the sliding cover 4, so the cartridge chamber lid 6 may be opened to insert the photo film cartridge 8 into the cartridge chamber 7 from the bottom. Then the spool drive shaft 61 is inserted in the engaging hole 42a of the spool 42, and the door drive shaft 83 is inserted in the engaging hole 39a of the door member 39. Since the door member 39 is in the closed position at the loading of the photo film cartridge 8, and the door rotating member 80 and thus the door drive shaft 83 are in the corresponding position as shown in FIG. 19B, the door drive shaft 83 of the door rotating member 80 is smoothly fitted in the engaging hole 39a of the door member 39. Since the key projection 61a provided on a peripheral portion of the spool drive shaft 61 may be resiliently pushed into the spool drive shaft 61, it is possible to insert the spool drive shaft 61 into the engaging hole 42a at any appropriate angular position of the spool 42. After a certain relative rotation of the spool drive shaft 61 to the spool 42, the key projection 61a comes to face the key groove of the engaging hole 42a, and is resiliently fitted in the key groove.

When the photo film cartridge 8 is fully inserted in the cartridge chamber 7 and the cartridge chamber lid 6 is closed, the cartridge detection switch 96 outputs the detection signal to the microcomputer 90. Thereafter while the sliding cover 4 is being moved from the cartridge exchange position to the work position, the coupling gear 75 is rotated in the clockwise direction in the drawings along with the movement of the driving rack 32. As a result, the interconnection rack plate 77 is moved to the right in the drawings, so the door rotating member 80 rotates in the clockwise direction, causing the door member 39 to rotate from the closed position to the open position. After the door rotating member 80 and thus the door member 39 rotate halfway from the closed position as shown in FIG. 6B to the open position as shown in FIG. 6A, the urging force of the spring 88 is switched to the clockwise direction, so the door member 39 moves to the open position before the sliding cover 4 reaches the work position. Thereby, the spool 42 is completely unlocked at the work position.

When the door member 39 reaches the open position, the contact strip 85b of the brush 85 is brought into contact with the contract rail 87b, as shown in FIG. 19A, so the door position detector switch 86 sends the microcomputer 90 the detection signal indicating that the door member 39 reaches the open position. Upon receipt of this detection signal after the detection signal from the cartridge detection switch 96, the microcomputer 90 starts a preliminary checking process for detecting the condition of usage of the photo film cartridge 8 and reading data from the data disc 44.

In the preliminary checking process, the microcomputer 90 drives the feed motor 52 in a first direction through the motor driver 94, to rotate the spool 42 in the rewinding direction. Then the sprocket 50 is rotated in the counterclockwise direction, as shown in FIG. 12, so the second gear 54 rotates clockwise, and the third gear 55 rotates counterclockwise. As a result, the fifth gear 59 rotates clockwise, and the eighth gear 65 rotates counterclockwise. Along with the eighth gear 65, the friction ring 67 rotates in the same direction. But the third protuberance 67d of the friction ring 67 soon comes into contact with the stopper pin 69a, as shown in FIG. 12, so the friction ring 67 stops at this position. Meanwhile, the eighth gear 65 continues counterclockwise rotation with its engaging rim 66 slipping on the inner periphery of the friction ring 67.

In this stop position of the friction ring 67, the locking cam protuberance 67a is in contact with the cam portion 71b of the locking lever 71, and pushes the locking lever 71 to rotate counterclockwise against the force of the coiled spring 72, thereby setting the locking claw 35 outside the camera body 3. In this way, the sliding cover 4 is prevented from sliding to the cartridge exchange position as soon as the preliminary checking process starts.

When the fifth gear 59 reaches the position shown in FIG. 10 after rotating clockwise by the predetermined angle from the initial position shown in FIG. 9, the clockwise rotation of the fifth gear 59 begins to be transmitted to the sixth gear 60, so the seventh gear 62 and thus the spool drive shaft 61 start rotating counterclockwise. Thereby, the spool 42 is rotated in the counterclockwise direction that corresponds to the rewinding direction. Since the spool 42 has been unlocked, the spool 42 rotates without any hindrance.

During this rotation of the spool 42 in the rewinding direction, the cartridge condition sensor 93 detects a notch of the data disc 45. Then, the microcomputer 90 determines at which rotational position of the feed motor 52 the notch is detected, and compares the rotational position to a reference position whose data is stored in the ROM 91. In this way, the microcomputer 90 determines the initial position of the index disc 45 that indicates the condition of the loaded photo film cartridge 8: one of the four conditions as mentioned above with respect to FIG. 7. Simultaneously, the bar code reader 97 reads the bar code on the data disc 44, to obtain the film data of the photo filmstrip 31. The film data is used for calculating an optimum combination of shutter speed and aperture size.

If it is determined that the photo film cartridge 8 is fully exposed or developed, the spool 42 is rotated in the winding direction till the index disc 45 is placed behind the cross-shaped opening 47c or the rectangular opening 47d respectively. Thereafter, the safety lock mechanism 63 is unlocked for enabling unloading the fully exposed or developed photo film cartridge 8.

After checking the condition of the photo film cartridge 8 and reading out the film data, the microcomputer 90 starts a film advancing process for advancing the photo filmstrip 31 from the cartridge shell 30 to place unexposed portion of the photo filmstrip 31 in an exposure position behind the lens barrel 10. In the film advancing process, the feed motor 52 is driven in a second direction to rotate the sprocket 50 clockwise, as shown in FIG. 14. Then, the second gear 54 turns counterclockwise, the third gear 55 clockwise, the fifth gear 9 counterclockwise, and the eighth gear 65 clockwise.

As the eighth gear 65 turns clockwise, the friction ring 67 turns in the same direction. But the locking cam protuberance 67a is soon brought into contact with the stopper pin 69a, so the friction ring 67 stops at this second lock position, while the eighth gear 65 continues turning in the clockwise direction. In this position, the second locking cam protuberance 67b is in contact with the cam portion 71b of the locking lever 71, and pushes the locking lever 71 in the counterclockwise direction, so the locking claw 35 is protruded outside the camera body 3. Thus, the sliding cover 4 is prevented from sliding to the cartridge exchange position immediately after the microcomputer 90 starts the film advancing process.

Because the unlocking cam surface 67c of the friction ring 67 is brought into contact with the cam portion 71b of the locking lever 71 immediately after the rotational direction of the feed motor 52 is switched, and the locking claw 35 is thereby retracted for a moment, if a power to slide the sliding cover 4 in the uncovering direction is applied in that moment, the sliding cover 4 could be moved to the cartridge exchange position. To prevent such an error, the microcomputer 90 drives the feed motor 52 at a higher speed in a period from the start of rotation of the feed motor 52 till the friction ring 67 is stopped by the stopper pin 69a or 69b, compared to a normal speed for the film feeding. In this way, the friction ring 67 is more quickly brought into contact with the stopper pin 69a or 69b after the rotational direction is switched, so the time interval of leaving the sliding cover 4 unlocked is shortened, and the possibility of unexpected shift of the sliding cover 4 to the cartridge exchange position is reduced to a minimum.

When the fifth gear 59 reaches the position shown in FIG. 9 after rotating counterclockwise by the predetermined angle from the position shown in FIG. 10, the counterclockwise rotation of the fifth gear 59 begins to be transmitted to the sixth gear 60, so the seventh gear 62 and thus the spool drive shaft 61 start rotating clockwise. Thereby, the spool 42 is rotated in the clockwise direction that corresponds to the unwinding or advancing direction. Thus, a leader of the photo filmstrip 31 is advanced out of the cartridge shell 30, and is fed to the film chamber.

Although it is not shown in the drawings, a take-up spool is mounted in the film chamber. The take-up spool is rotated by the feed motor 52 at a higher speed compared to the speed of advancing the photo filmstrip 31 by the spool drive shaft 61. Therefore, after the leader of the photo filmstrip 31 is fastened to the take-up spool, the photo filmstrip 31 is wound up onto the take-up spool by the rotation of the take-up spool, while the seventh gear 62 with the spool drive shaft 61 is disconnected from the feed motor 52 through a not-shown clutch that is provided between the gear belt 49 and the feed motor 52, so the seventh gear 62 is rotated by the rotation of the spool 42.

If the loaded photo film cartridge 8 is a new one, an initial frame recording portion is placed in the exposure position. If the photo film cartridge 8 is partly exposed, the microcomputer 90 detects an unexposed frame recording portion next to the exposed portion by checking the data written on the magnetic recording layer in association with the exposed frames, and places the unexposed frame recording portion in the exposure position. After framing a subject through the viewfinder 12 and operating the zooming button 22a or 22b, the photographer presses the shutter button 25 to expose the frame recording portion placed in the exposure position.

After each exposure, the feed motor 52 is driven to rotate the take-up spool so as to take up the photo filmstrip 31 by a length corresponding to one frame. Thus, a next unexposed frame recording portion is placed in the exposure position. During this one-frame advancing, the magnetic head 99 is driven through the head driver 100 to write photographic data relating to the exposed frame on the magnetic recording layer of the photo filmstrip 31.

Because the driving rack 32 is not engaged with the coupling gear 75 while the sliding cover 4 moves between the rest position and the work position, as shown in FIGS. 15 and 16, the door rotating member 80 is not actuated, and thus the door member 39 is held in the open position. Therefore, the photo filmstrip 31 would not be pinched by the door member 39 during the usual operating condition of the camera 2.

Since the friction ring 67 does not rotate and remains in the stop position during the one-frame advancing, the locking claw 35 still protrudes outside the camera body 3, so the sliding cover 4 is stopped at the safety lock position even if it is pushed in the uncovering direction. Since the distance from the work position to the safety lock position is very small, the movement of the sliding cover 4 from the work position to the safety lock position causes the coupling gear 75 and thus the pinion 81 to rotate so little in the closing direction of the door member 39, that the door member 39 does not pinch the photo filmstrip 31, as is shown in FIG. 6C.

When the all available frame recording portions are exposed, or the rewind switch is operated, the microcomputer 90 starts a rewinding process for rewinding the photo filmstrip 31 into the cartridge shell 30 by rotating the spool 42 in the rewinding direction. In the rewinding process, the feed motor 52 is driven in the first direction to rotate the sprocket 50 in the counterclockwise direction, so the eighth gear 65 rotates counterclockwise, and the friction ring 67 rotates along with the eighth gear 65, so the third protuberance 67d comes into contact with the stopper pin 69b, in the same way as shown in FIG. 12. Also during the rewinding process, the locking claw 35 protrudes out of the camera body 3, so the sliding lid 4 would not slide to the cartridge exchange position, and the door member 39 would not be closed.

After the photo filmstrip 31 is fully rewound into the cartridge shell 30, the spool 42 is still rotated in the rewinding direction for positioning the index disc 45 in accordance with the condition of usage of the photo filmstrip 31. That is, if the photo filmstrip 31 is rewound after being fully exposed, the index disc 45 is positioned to be visible through the index opening 47c. If the photo filmstrip 31 is rewound before being fully exposed, the index disc 45 is positioned to be visible through the index opening 47b.

Thereafter, the microcomputer 90 executes an unlocking process by driving the feed motor 52 again in the second direction corresponding to the advancing direction, while monitoring the signal from the encoder 95, so as to rotate the friction ring 67 in the clockwise direction by a predetermined amount for bringing the unlock cam surface 67 of the friction ring 67 into contact with the cam portion 71b of the lock lever 71. The clockwise rotation of this predetermined amount does not bring the engaging projections 60a of the sixth gear 60 into engagement with the end of the sectorial cutouts 59a of the fifth gear 59, so the spool 42 is not displaced from the position determined by the preceding step of positioning the index disc 45.

When the unlock cam surface 67c is brought into contact with the cam portion 71b of the locking lever 71, as shown in FIG. 11, the third protuberance 67d is detected by the unlock position sensor 68. If the detection signal is not output from the unlock position sensor 68 even when a predetermined time has passed after the start of this unlocking process, the microcomputer 90 executes an error alarming process. For example, the feed motor 52 is deactivated, a warning is displayed on the LCD panel 18, and data of the error is recorded in the EEPROM 92. It is possible to repeat the index disc positioning process and the unlocking process after this error alarming process, automatically or in response to a manual operation.

After the friction ring 67 is rotated to the unlock position in this way, the sliding cover 4 is allowed to slide to the cartridge exchange position to remove the photo film cartridge 8 from the cartridge chamber 7. As the sliding cover 4 slides from the work position to the cartridge exchange position, the door member 39 is rotated to the closed position in the same way as described above. Because the rotation of the door rotating member 80 and thus the door member 39 is accelerated by the urging force of the coiled spring 88 after the door member 39 rotates halfway from the open position to the closed position, the door member 39 reaches the closed position before the sliding cover 4 reaches the cartridge exchange position. The photo filmstrip 31 is surely prevented from being fogged when the cartridge chamber lid 6 is opened.

Although the present invention has been described with respect to the embodiment shown in the drawings, the present invention is not to be limited to the above embodiment. For example, it is possible to dispose a driving rack on the inside surface of the top wall of the sliding cover such that the driving rack may be brought into engagement with the pinion directly. In that case, the coupling gear and the interconnection rack plate can be omitted. Thus, the mechanical construction may be modified appropriately.

Although the camera of the above embodiment is provided with the sliding cover that covers most of the camera body in the rest position, the present invention is applicable to those cameras where a sliding cover just covers a front portion, a rear portion or a top portion of the camera body. The present invention is also applicable to those cameras having a cover member that does not slide but moves in a different way.

Thus various modification will be possible to those skilled in the art, without departing from the scope of the invention as specified in the appended claims.

What is claimed is:

1. A camera comprising:

a camera body directed to loading a photo film cartridge having a light-shielding door member mounted pivotally in a film port thereof to rotate between a closed position and an open position for closing and opening the film port respectively;

a cover member mounted on the camera body and movable between a cartridge exchange position for permitting loading and unloading the photo film cartridge, a rest position for deactivating the camera, and a work position for permitting photography through the camera, the cover member prohibiting loading or unloading the photo film cartridge in the rest and work positions;

a door drive shaft that is engaged with one axial end of the door member when the photo film cartridge is loaded, for rotating the door member between the closed position and the open position;

an input member that rotates together with the drive shaft;

a spring force member for urging the drive shaft to rotate alternatively in a direction to open the door member or in a direction to close the door, such that the spring force member urges the drive shaft in the opening direction and holds the door member in the open position after the drive shaft rotates through a predetermined angle in the opening direction from the closed position of the door member, whereas the spring force member urges the drive shaft in the closing direction and holds the door member in the closed position after the drive shaft rotates through a predetermined angle in the closing direction from the open position of the door member; and an engaging member that engages the cover member with the input member only while the cover member moves between the work position and the cartridge exchange position, for causing the input member to rotate in the closing direction as the cover member moves from the work position to the cartridge exchange position, and causing the input member to rotate in the opening direction as the cover member moves from the cartridge exchange position to the work position.

2. A camera as claimed in claim 1, wherein the input member is a pinion that rotates in coaxial with the drive shaft, and the engaging member comprises a rack provided securely on the cover member.

3. A camera as claimed in claim 2, wherein the cover member slides on the camera body between the cartridge exchange position and the work position and the rest position.

4. A camera as claimed in claim 3, wherein the engaging member further comprises a coupling gear and a rack plate mounted in the camera body, wherein the coupling gear being brought into engagement with the rack and is rotated by the movement of the cover member while the cover member moves between the work position and the cartridge exchange position, whereas the rack plate interconnects the coupling gear to the pinion and moves in parallel with the cover member as the coupling gear rotates.

5. A camera as claimed in claim 3, further comprising a lock mechanism for locking the cover member at a safety lock position provided between the work position and the cartridge exchange position, the lock mechanism comprising a locking claw mounted to the camera body, and a cam plate mounted securely on an inside of the cover member, the cam plate being engaged with the locking claw to stop the cover member at the safety lock position when the locking claw is protruded out of the camera body, wherein the rack is formed integrally with the cam plate.

6. A camera as claimed in claim 5, wherein the locking claw is protruded out of the camera body or retracted inside the camera body by a rotational power applied from a motor that is used for rotating a spool of the photo film cartridge.

* * * * *